(12) United States Patent
Sheng

(10) Patent No.: US 10,616,864 B2
(45) Date of Patent: Apr. 7, 2020

(54) ALLOCATING RESOURCES FOR WIRELESS SIDELINK DIRECT COMMUNICATIONS

(71) Applicant: Sharp Kabushiki Kaisha, Sakai, Osaka (JP)

(72) Inventor: Jia Sheng, Vancouver, WA (US)

(73) Assignee: Sharp Kabushiki Kaisha, Sakai, Osaka (JP)

( * ) Notice: Subject to any disclaimer, the term of this patent is extended or adjusted under 35 U.S.C. 154(b) by 0 days.

(21) Appl. No.: 15/228,579

(22) Filed: Aug. 4, 2016

(65) Prior Publication Data

US 2017/0041902 A1    Feb. 9, 2017

Related U.S. Application Data

(60) Provisional application No. 62/202,642, filed on Aug. 7, 2015.

(51) Int. Cl.
*H04W 72/00* (2009.01)
*H04W 4/00* (2018.01)
*H04W 72/02* (2009.01)
*H04W 76/36* (2018.01)
*H04W 76/14* (2018.01)

(52) U.S. Cl.
CPC ........... *H04W 72/02* (2013.01); *H04W 76/36* (2018.02); *H04W 76/14* (2018.02)

(58) Field of Classification Search
CPC .. H04W 72/02; H04W 76/066; H04W 76/023
See application file for complete search history.

(56) References Cited

U.S. PATENT DOCUMENTS

| | | | |
|---|---|---|---|
| 2013/0039339 A1* | 2/2013 | Rayavarapu | H04W 76/19 370/331 |
| 2014/0094183 A1* | 4/2014 | Gao | H04W 72/048 455/450 |
| 2015/0023264 A1 | 1/2015 | Tiirola et al. | |
| 2015/0215903 A1* | 7/2015 | Zhao | H04W 72/04 370/329 |
| 2015/0223217 A1 | 8/2015 | Chen et al. | |
| 2015/0271720 A1 | 9/2015 | Yamada et al. | |
| 2015/0271841 A1 | 9/2015 | Yamada et al. | |
| 2015/0271846 A1 | 9/2015 | Kowalski et al. | |
| 2015/0319797 A1 | 11/2015 | Yamada et al. | |

(Continued)

FOREIGN PATENT DOCUMENTS

WO    WO 2015/095586 A1    6/2015
WO    WO 2015/096719 A1    7/2015

OTHER PUBLICATIONS

Barry, Lance Leonard. "Teaching a Way Is Not Teaching Away," Journal of the Patent and Trademark Office Society vol. 79, No. 12 (Dec. 1997): p. 867-882. HeinOnline, https://heinonline.org/HOL/P?h=hein.journals/jpatos79&i=869. (Year: 1997).*

(Continued)

*Primary Examiner* — Rafael Pérez-Gutiérrez
*Assistant Examiner* — Mark G. Pannell
(74) *Attorney, Agent, or Firm* — Nixon & Vanderhye P.C.

(57) ABSTRACT

Various techniques, apparatus, and methods for allocating resources for sidelink direct communication, including collision avoidance and resource pre-emption techniques, apparatus, and methods.

2 Claims, 13 Drawing Sheets

(56) References Cited

U.S. PATENT DOCUMENTS

| | | | |
|---|---|---|---|
| 2015/0327240 A1 | 11/2015 | Yamada et al. | |
| 2015/0382324 A1 | 12/2015 | Sheng et al. | |
| 2016/0135240 A1* | 5/2016 | Yoon | H04W 76/14 |
| | | | 370/329 |
| 2016/0323869 A1 | 11/2016 | Xu et al. | |
| 2017/0171690 A1* | 6/2017 | Kim | H04W 4/00 |
| 2019/0150102 A1* | 5/2019 | Lee | H04W 52/346 |

OTHER PUBLICATIONS

U.S. Appl. No. 62/055,114, filed Sep. 25, 2014, entitled Method and Apparatus for Unlicensed Communications Band Access.

U.S. Appl. No. 62/104,365, filed Jan. 16, 2015, entitled Method and Apparatus for Selecting a Synchronization Signal Source for Device-To-Device Communcations.

3GPP TS 36.201 v12.1.0, Technical Specification, $3^{rd}$ Generation Partnership Project; Technical Specification Group Radio Access Network; Evolved Universal Terrestrial Radio Access (E-UTRA); LTE Physical Layer; General Description (Release 12) (Dec. 2014).

3GPP TS 36.211 v12.4.0, Technical Specification, $3^{rd}$ Generation Partnership Project; Technical Specification Group Radio Access Network; Evolved Universal Terrestrial Radio Access (E-UTRA); Physical Channels and Modulation (Release 12) (Dec. 2014).

3GPP TS 36.212 v12.3.0, Technical Specification, $3^{rd}$ Generation Partnership Project; Technical Specification Group Radio Access Network; Evolved Universal Terrestrial Radio Access (E-UTRA); Multiplexing and Channel Coding (Release 12) (Dec. 2014).

3GPP TS 36.213 v12.0.0, Technical Specification, $3^{rd}$ Generation Partnership Project; Technical Specification Group Radio Access Network; Evolved Universal Terrestrial Radio Access (E-UTRA); Physical Layer Procedures (Release 12) (Dec. 2013).

3GPP TS 36.214 v12.1.0, Technical Specification, 3rd Generation Partnership Project; Technical Specification Group Radio Access Network; Evolved Universal Terrestrial Radio Access (E-UTRA); Physical Layer; Measurements (Release 12) (Dec. 2014).

3GPP TS 36.300 v12.4.0, Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 12) (Dec. 2014).

3GPP TS 36.304 v12.3.0, Technical Specification, 3rd Generation Partnership Project; Technical Specification Group Radio Access Network; Evolved Universal Terrestrial Radio Access (E-UTRA); User Equipment (UE) Procedures in Idle Mode (Release 12) (Dec. 2014).

3GPP TS 36.306 v12.3.0, Technical Specification, $3^{rd}$ Generation Partnership Project; Technical Specification Group Radio Access Network; Evolved Universal Terrestrial Radio Access (E-UTRA); User Equipment (UE) Radio Access Capabilities (Release 12) (Dec. 2014).

3GPP TS 36.331 v12.4.0, Technical Specification, $3^{rd}$ Generation Partnership Project; Technical Specification Group Radio Access Network; Evolved Universal Terrestrial Radio Access (E-UTRA); Radio Resource Control (RRC) Protocol Specification (Release 12) (Dec. 2014).

3GPP TS 22.179 V13.2.0 (Jun. 2015), 3rd Generation Partnership Project; Technical Specification Group Services and System Aspects; Mission Critical Push To Talk (MCPTT) over LTE; Stage 1 (Release 13).

3GPP TS 36.321 v12.4.0, Technical Specification, $3^{rd}$ Generation Partnership Project; Technical Specification Group Radio Access Network; Evolved Universal Terrestrial Radio Access (E-UTRA); Medium Access Control (MAC) Protocol Specification (Release 12) (Dec. 2014).

3GPP TS 36.322 v12.1.0, Technical Specification, $3^{rd}$ Generation Partnership Project; Technical Specification Group Radio Access Network; Evolved Universal Terrestrial Radio Access (E-UTRA); Radio Link Control (RLC) Protocol Specification (Release 12) (Sep. 2014).

3GPP TS 36.323 v12.2.0, Technical Specification, $3^{rd}$ Generation Partnership Project; Technical Specification Group Radio Access Network; Evolved Universal Terrestrial Radio Access (E-UTRA); Packet data Convergence Protocol (PDCP) Specification (Release 12) (Dec. 2014).

International Search Report and Written Opinion dated Oct. 14, 2016 in PCT Application No. PCT/US2016/045763.

R2-144864, 3GPP TSG-RAN WG2 Meeting #88, Sony, "Discovery/Communication Resource Pool Priority Information", San Francisco, USA, Nov. 17-21, 2014.

EP Supplementary Search Report dated Mar. 4, 2019 in EP application 16835692.1.

* cited by examiner

| NON-NOMINAL RESOURCE POOL STRUCTURE | | | |
|---|---|---|---|
| RESOURCE POOL #1 | RESOURCE POOL #2 | RESOURCE POOL #3 | RESOURCE POOL #4 |
| RESOURCE POOL #5 | RESOURCE POOL #6 | RESOURCE POOL #7 | RESOURCE POOL #8 |
| RESOURCE POOL #9 | RESOURCE POOL #10 | RESOURCE POOL #11 | RESOURCE POOL #12 |
| RESOURCE POOL #13 | RESOURCE POOL #14 | RESOURCE POOL #15 | RESOURCE POOL #16 |

OVERRIDE POOL QUANTITY, e.g., 16

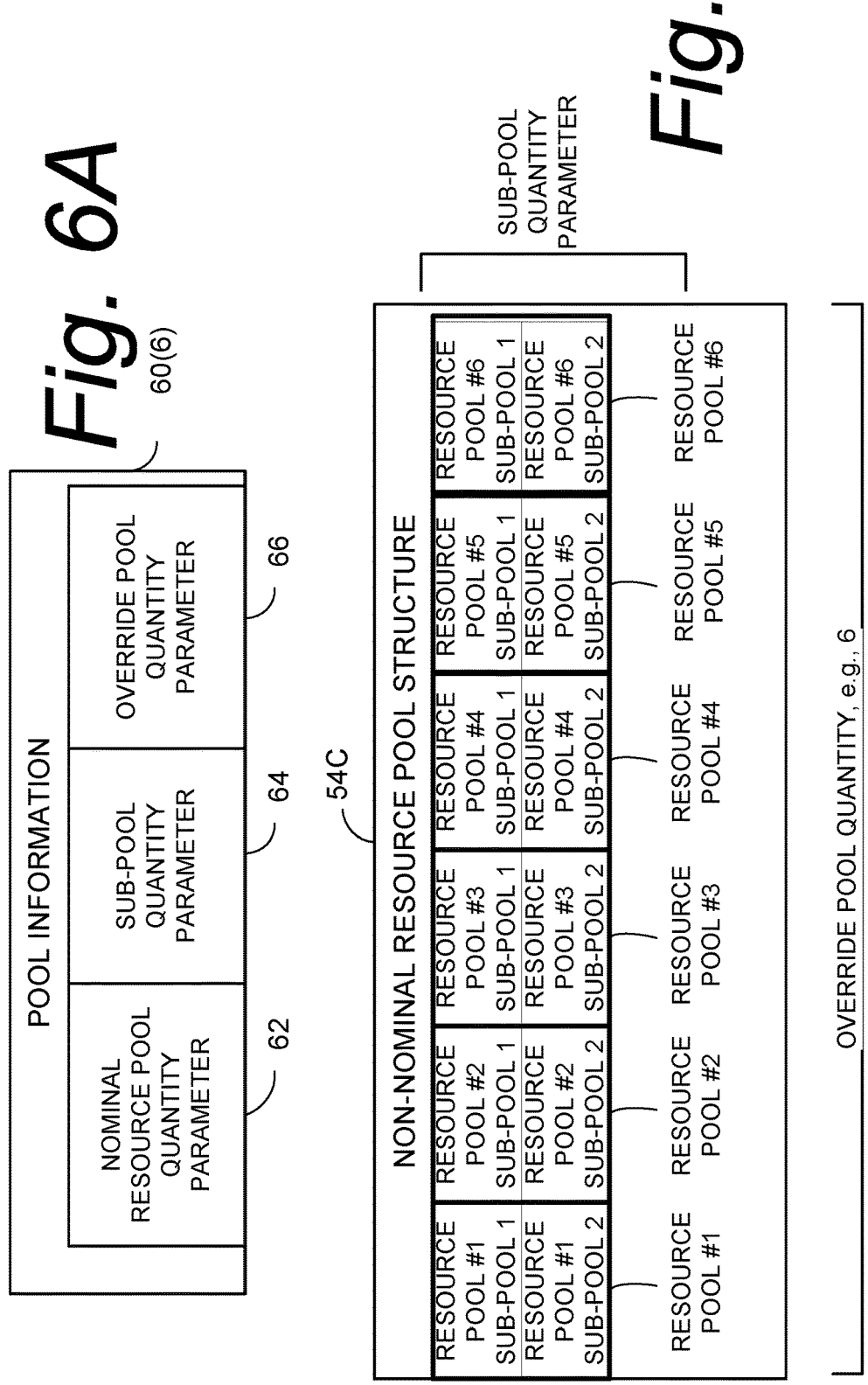

ALLOCATING RESOURCES FOR WIRELESS SIDELINK DIRECT COMMUNICATIONS

This application claims the priority and benefit of U.S. Provisional Patent Application 62/202,642, filed Aug. 7, 2015, entitled "ALLOCATING RESOURCES FOR WIRELESS SIDELINK DIRECT COMMUNICATIONS", which is incorporated herein by reference in its entirety.

TECHNICAL FIELD

The technology relates to wireless communications, and particularly to allocating or granting radio resources for wireless sidelink direct communications, also called device-to-device (D2D) communications.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "wide area network" ("WAN") or "Cellular communication".

It is also possible for two user equipment terminals in close proximity to each other to establish a direct link without the need to go through a base station. Telecommunications systems may use or enable sidelink direct communication, in which two or more user equipment terminals directly communicate with one another. Sidelink direct communication is also sometimes referred to as device-to-device (D2D) communication. In sidelink direct communication, voice and/or data traffic (referred to herein as "communication signals") from one user equipment terminal to one or more other user equipment terminals may not be communicated through a base station or other network control device of a telecommunication system.

Various aspects of sidelink direct communications are described in one or more of the following, all of which are incorporated herein by reference in their entirety:
U.S. patent application Ser. No. 14/660,528, filed Mar. 17, 2015;
U.S. patent application Ser. No. 14/660,491, filed Mar. 17, 2015;
U.S. patent application Ser. No. 14/660,559, filed Mar. 17, 2015;
U.S. patent application Ser. No. 14/660,587, filed Mar. 17, 2015;
U.S. patent application Ser. No. 14/660,622, filed Mar. 17, 2015;
U.S. patent application Ser. No. 14/749,898, filed Jun. 25, 2015;
U.S. Provisional Patent application 62/055,114, filed Sep. 25, 2014;
U.S. Provisional Patent application 62/104,365, filed Jan. 16, 2015;

What is needed are methods, apparatus, and/or techniques which for allocating resources for sidelink direct communication in a manner that facilitates either resource collision avoidance or resource pre-emption.

SUMMARY

The technology disclosed herein provides various techniques, apparatus, and methods for allocating resources for sidelink direct communication. In an example embodiment and mode a user equipment (UE) comprises a processor and a memory in electronic communication with the processor. Instructions stored in the memory are executable to receive a configuration of first resource pools, and to perform a sidelink communication using the first resource pools. The first resource pools consist of second resource pools and additional resource pools, and the second resource pools are available for UEs for which the additional resource pools are not available. A method in a user equipment (UE) comprises receiving a configuration of first resource pools; and performing a sidelink communication using the first resource pools. In the method the first resource pools consist of second resource pools and additional resource pools, and the second resource pools are available for UEs for which the additional resource pools are not available.

The technology disclosed herein also provides various techniques, apparatus, and methods for avoiding resource collision and/or pre-empting resources when allocating resources for sidelink direct communication.

In one of its aspects the technology disclosed herein, collision avoidance is facilitated by method and apparatus which provide a non-nominal resource pool structure which is configured to facilitate quality of service (QoS) requirements, and particularly methods and apparatus are provided for receiving information about and using a resource pool structure different from that specified by a nominal resource pool quantity parameter.

In one of its aspects the technology disclosed herein, collision avoidance is facilitated by method and apparatus which provide discriminate rather than random resource selection from a selected resource pool. One example embodiment and mode of discriminate resource selection comprises contention avoidance resource selection. Another example embodiment and mode of discriminate resource selection comprises algorithmic resource selection.

In one of its aspects the technology disclosed herein, under control of a wireless terminal a high priority sidelink direct communication is able to pre-empt resources used for transmission by low priority sidelink direct communication. In an example embodiment and mode, a wireless terminal participating in a sidelink direct communication obtains one or more indicators or flags ("pre-emption posture indicators") which reflect or specify pre-emption posture of the sidelink direct communication.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 6A is a diagrammatic view showing pool information which comprises a nominal resource pool quantity parameter; a sub-pool quantity parameter; and an override pool quantity parameter.

FIG. 6B is a diagrammatic view of a non-nominal resource pool structure configured in accordance with the pool information of the type of FIG. 6A.

DETAILED DESCRIPTION

Figure 1:
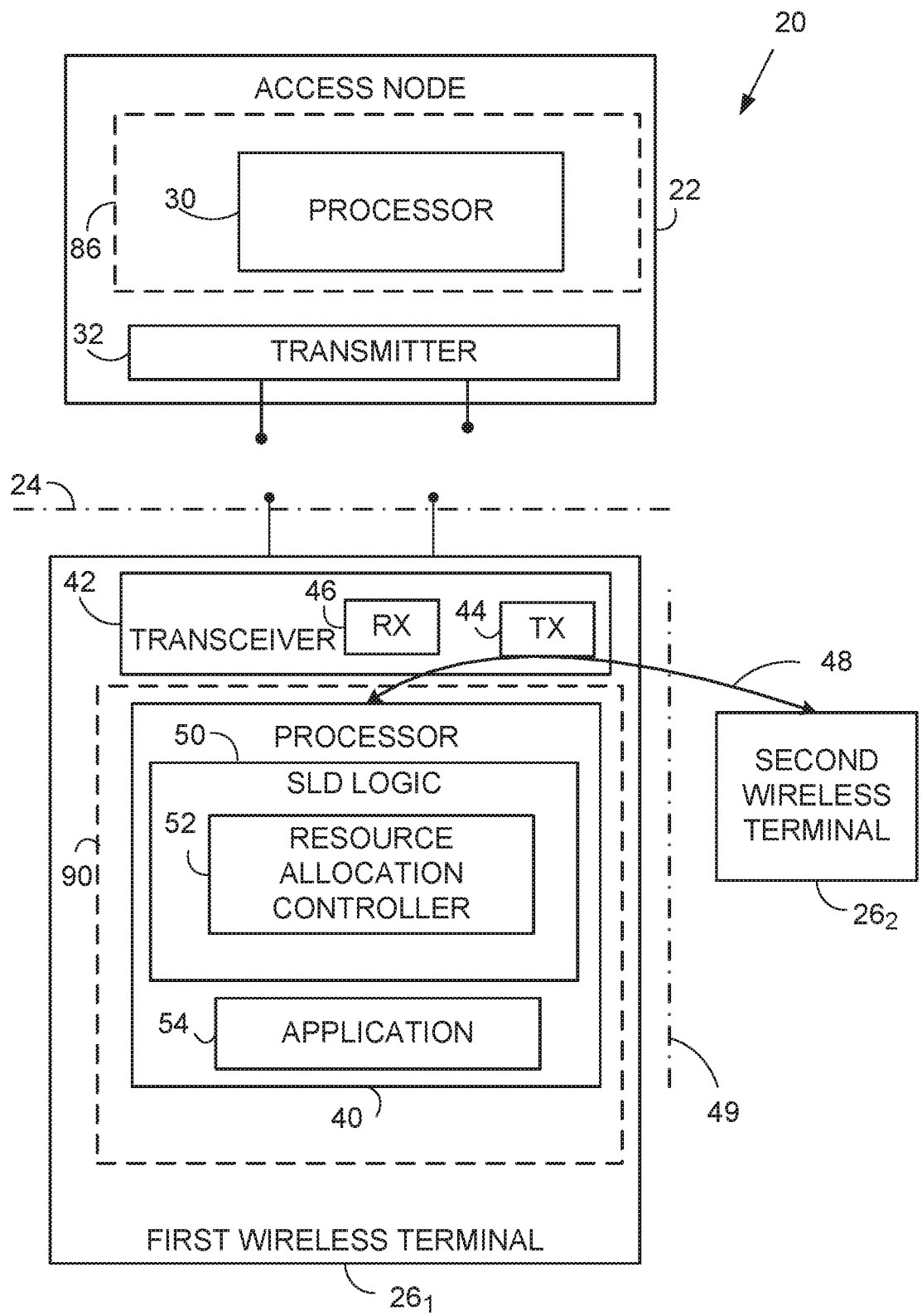
FIG. 1 is a schematic view of an example generic embodiment of a radio communications network which allocates resources for sidelink direct communication.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "sidelink direct communication" may refer to a mode of communication between or among wireless terminals that operate on a cellular network or other telecommunications system in which the communication from one wireless terminal to another wireless terminal does not pass through a centralized base station or other device in the cellular network or other telecommunications system. The "sidelink direct communication" encompasses one or both of sidelink signaling or control information and sidelink data. The term "sidelink direct" may also be shortened to "sidelink", abbreviated as "SL", and as such "sidelink" is used herein to refer to sidelink direct. Moreover, as explained above, sidelink direct communication (e.g., sidelink communication) is also known by another term "device-to-device ("D2D") communication". Yet further, the term "ProSe" (Proximity Services) direct communication may be used in lieu of sidelink direct communication. Therefore, it is to be understood that herein the terms "sidelink direct", 'sidelink" (SL), "ProSe" and "device-to-device (D2D)" may be interchangeable and synonymous.

Thus, as mentioned above, sidelink direct communications differs from "WAN" or "Cellular communication" which is or involves communication between the base station and the wireless terminal. Communication data is sent using communication signals and can include voice communications or data communications intended for consumption by a user of a wireless terminal. Communication signals may be transmitted directly from a first wireless terminal to a second wireless terminal via sidelink direct communication. In various aspects, all, some, or none of the control signaling related to the SL packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal ("UE", mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, and/or 13), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, a "SL signal" or "SL signals" includes channels, reference signals, and synchronization signals for SL communication and/or discovery.

SL communication, e.g., sidelink direct communication, can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for present and future generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which SL communication may be used. An aspect of the 3GPP work pertains to functionality to allow sidelink direct communication to enable Proximity Services (ProSe) for public safety and, certain non-public safety requirements (See, e.g., RP-122009).

A non-exhaustive list of 3GPP documents which describe, at least in part, device-to-device (D2D) communication (e.g., "sidelink direct communication") include the following (all of which are incorporated herein by reference in their entireties):

3GPP TS 36.201 v12.1.0, Technical Specification, 3rd Generation Partnership Project; Technical Specification Group Radio Access Network; Evolved Universal Terrestrial Radio Access (E-UTRA); LTE Physical Layer; General Description (Release 12) (2014-12);

3GPP TS 36.211 v12.4.0, Technical Specification, 3rd Generation Partnership Project; Technical Specification Group Radio Access Network; Evolved Universal Terrestrial Radio Access (E-UTRA); Physical Channels and Modulation (Release 12) (2014-12);

3GPP TS 36.212 v12.3.0, Technical Specification, 3rd Generation Partnership Project; Technical Specification Group Radio Access Network; Evolved Universal Terrestrial Radio Access (E-UTRA); Multiplexing and Channel Coding (Release 12) (2014-12);

3GPP TS 36.213 v12.0.0, Technical Specification, 3rd Generation Partnership Project; Technical Specification Group Radio Access Network; Evolved Universal Terrestrial Radio Access (E-UTRA); Physical Layer Procedures (Release 12) (2013-12);

3GPP TS 36.214 v12.1.0, Technical Specification, 3rd Generation Partnership Project; Technical Specification Group Radio Access Network; Evolved Universal Terrestrial Radio Access (E-UTRA); Physical Layer; Measurements (Release 12) (2014-12);

3GPP TS 36.300 v12.4.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 12) (2014-12);

3GPP TS 36.304 v12.3.0, Technical Specification, 3rd Generation Partnership Project; Technical Specification Group Radio Access Network; Evolved Universal Terrestrial Radio Access (E-UTRA); User Equipment (UE) Procedures in Idle Mode (Release 12) (2014-12);

3GPP TS 36.306 v12.3.0, Technical Specification, 3rd Generation Partnership Project; Technical Specification Group Radio Access Network; Evolved Universal Terrestrial Radio Access (E-UTRA); User Equipment (UE) Radio Access Capabilities (Release 12) (2014-12);

3GPP TS 36.321 v12.4.0, Technical Specification, 3rd Generation Partnership Project; Technical Specification Group Radio Access Network; Evolved Universal Terrestrial Radio Access (E-UTRA); Medium Access Control (MAC) Protocol Specification (Release 12) (2014-12);

3GPP TS 36.322 v12.1.0, Technical Specification, 3rd Generation Partnership Project; Technical Specification Group Radio Access Network; Evolved Universal Terrestrial Radio Access (E-UTRA); Radio Link Control (RLC) Protocol Specification (Release 12) (2014-9);

3GPP TS 36.323 v12.2.0, Technical Specification, 3rd Generation Partnership Project; Technical Specification Group Radio Access Network; Evolved Universal Terrestrial Radio Access (E-UTRA); Packet data Convergence Protocol (PDCP) Specification (Release 12) (2014-12); and 3GPP TS 36.331 v12.4.0, Technical Specification, 3rd Generation Partnership Project; Technical Specification Group Radio Access Network; Evolved Universal Terrestrial Radio Access (E-UTRA); Radio Resource Control (RRC) Protocol Specification (Release 12) (2014-12).

3GPP TS 22.179 V13.2.0 (2015-06), 3rd Generation Partnership Project; Technical Specification Group Services and System Aspects; Mission Critical Push To Talk (MCPTT) over LTE; Stage 1 (Release 13).

In 3GPP agreements provide two general modes of operation for a wireless terminal supporting sidelink direct communications. A first mode of operation, originally referred to as "Mode 1", is a scheduled resource allocation mode. A second mode of operation, originally referred to as "Mode 2", is a UE autonomous resource selection mode.

For the Scheduled resource allocation mode (e.g., Mode 1) the wireless terminal (UE) needs to be RRC_CONNECTED in order to transmit data. In general, the wireless terminal requests transmission resources from the base station (e.g., an eNodeB also known as "eNB"). In response to the request, the eNB schedules transmission resources for transmission of Sidelink Control and data. In particular, the wireless terminal sends a scheduling request (D-SR or Random Access) to the eNB followed by a ProSe BSR (buffer status report). Based on the ProSe BSR the eNB can determine that the wireless terminal has data for a ProSe Direct Communication transmission and can estimate the resources needed for transmission. The eNB can then schedule transmission resources for ProSe Direct Communication using a configured sidelink radio network temporary identifier (SL-RNTI).

In the UE autonomous resource selection mode, also known as Mode 2, the wireless terminal (UE) on its own selects resources from resource pools and performs transport format selection to transmit sidelink control and data. If the wireless terminal is out of coverage for ProSe Direct Communication it can only use the UE autonomous resource selection mode.

For Mode 2 (the UE autonomous resource selection mode), the wireless terminal has three ways to obtain resource pool information: (1) Broadcast information (through System Information Block (SIB) 18 message) (2) Dedicated RRC signaling (through an RRCConnectionReconfiguration message) (3) Pre-configured information. The wireless terminal then randomly selects resources for transmission from the resource pool indicated by one of the above resource allocation methods.

If the wireless terminal is in coverage for ProSe Direct Communication the wireless terminal may use scheduled resource allocation or UE autonomous resource selection as per eNB configuration. If the wireless terminal is in coverage for ProSe Direct Communication the wireless terminal may use only the resource allocation mode indicated by eNB configuration unless one of several specified exceptional cases occurs.

The allocation of resources, either by the eNB in the scheduled resource allocation mode or by the wireless terminal in the UE autonomous resource selection mode, is from among one or more resource pools. Discussed below are resource pool allocation techniques for sidelink control followed by resource pool allocation for sidelink data.

When the wireless terminal is out of coverage for ProSe Direct Communication, the resource pool used for reception and the resource pool used for transmission are both pre-configured.

When the wireless terminal is in coverage for ProSe Direct Communication, the resource pool used for reception is configured by the eNB via radio resource control (RRC), in broadcast signaling. However when the wireless terminal is in coverage, the resource pools used for transmission are configured as follows: (1) the resource pool used for transmission is configured by the eNB via RRC, in dedicated or broadcast signalling, if UE autonomous resource selection is used; (2) the resource pool used for transmission is configured by the eNB via RRC, in dedicated signalling if scheduled resource allocation is used. Regarding (2), the eNB schedules the specific resource(s) for Sidelink Control transmission within the configured reception pool. It should be noted that, in order to perform communication even when some wireless terminals are in-coverage and some wireless terminals are out of coverage, all wireless terminals (i.e., both in and out of coverage) should be configured with reception resource pools for Sidelink Control which are the union of the resource pools used for transmission of Sidelink Control in the serving cell and neighbor cells and transmission of Sidelink Control for out of coverage.

In terms of resource pool utilization for sidelink data, when the wireless terminal is out of coverage for ProSe Direct Communication, the resource pool used for reception and the resource pool used for transmission are both pre-configured. When the wireless terminal is in coverage for ProSe Direct Communication, the resource pools used for transmission and reception are configured by the eNB via RRC, in dedicated or broadcast signalling, if UE autonomous resource selection is used. There is no resource pool for transmission if scheduled resource allocation is used.

As mentioned above, when a wireless terminal is in the UE autonomous resource selection mode the wireless terminal is provided with resource pool information. As indicated above, the resource pool information may be provided in three ways: (1) Broadcast information (through System Information Block (SIB) 18 message) (2) Dedicated RRC signaling (through an RRCConnectionReconfiguration message) (3) Pre-configured information. The resource pool information typically comprises a list of resource pools, with each resource pool in turn typically comprising plural resources. When needing resources in the UE autonomous resource selection mode, the wireless terminal first selects a resource pool (a "selected resource pool") from plural possible resource pools listed in the resource pool information. In many situations the selected resource pool is a first resource pool listed in the resource pool information provide to the wireless terminal. In other situations, the resource pool chosen from the list of the resource pool information may be on the basis of priority (e.g., service priority) when resource pools are differentiated in terms of priority (e.g., quality of service). Then, after the resource pool is selected, the wireless terminal randomly selects, from the selected resource pool, a resource for use in the sidelink direct communication.

The random selection of a resource for sidelink direct communications from a selected resource pool introduces a problem addressed by the technology disclosed herein. In particular, random resource selection without any resource pool access control introduces a potential of resource usage collision. The potential of resource usage collision arises from the fact that the wireless terminal may not have real time resource pool occupation information. In other words, the wireless terminal may not have real time information about utilization of resources of the resource pool by other wireless terminals. Such particularly occurs when the wireless terminal obtains the resource pool information through SIB 18 or pre-configuration. When the wireless terminal obtains the resource pool information dedicated signaling, the eNB should have the real time resource pool occupation information and may instruct the wireless terminal with the real time resource pool usage information. But when the wireless terminal has no knowledge of real time resource pool usage information, random selection of a radio resource from a selected resource pool may result in selection by the wireless terminal of a resource already in use, e.g., in use by another wireless terminal for a sidelink direct communication.

As mentioned above, when needing resources in the UE autonomous resource selection mode, the wireless terminal first selects a resource pool (a "selected resource pool") from plural possible resource pools listed in the resource pool information. Wireless terminals use the pool of resources indicated by the first entry of the resource pool information they receive. The first entry of the received resource pool information (e.g., the first entry of the information element (IE) carrying the resource pool information) is used as the selected resource pool regardless of whether the wireless terminal obtains the resource pool information from dedicated signaling, SIB, or pre-configuration. This technique of always using the first entry of the received resource pool information is herein also referred to as "common resource pool access".

If there are many wireless terminals in an incident area requiring the resources for transmission from the same resource pool allocation method, e.g., from SIB 18, using the common resource pool access technique the wireless terminals will all use the pool indicated by the first entry of the same broadcast signaling. As a result, in a scenario when there are many wireless terminals receiving similar resource pool allocations, there is a fairly high probability that two or more of the similarly situated wireless terminals may randomly select a same resource from the finite number of resources of the selected resource pool. Thus, there is a high probability that collision may occur.

The probability of collision is lessened if the wireless terminals needing sidelink direct resources do not all automatically select the first resource pool listed in the resource pool information.

As another development, it is anticipated that a new public safety feature, Mission Critical Push To Talk (MCPTT), will be introduced in 3GPP Release 13. The new Mission Critical Push To Talk (MCPTT) feature may require, in some mission critical situations, that a high priority wireless terminal's transmission be guaranteed. Guaranteed transmission means that the MCPTT wireless terminal always be afforded resources, e.g., always be afforded resources for sidelink direct communications and thus not be denied resources by reason of collision.

The information element (IE) which contains system information related to sidelink, SystemInformationBlockType18, may indicate E-UTRAN supports the SidelinkUE information procedure and may contain sidelink direct communication related resource configuration information as shown in Listing 1. commRxPool may indicate the resources by which the UE is allowed to receive sidelink direct communication while in RRC_IDLE and while in RRC_CONNECTED. commSyncConfig may indicate the configuration by which the UE is allowed to receive and transmit synchronisation information. E-UTRAN may configure commSyncConfig including txParameters when configuring UEs by dedicated signalling to transmit synchronisation information. commTxPoolExceptional may indicate the resources by which the UE is allowed to transmit sidelink direct communication in exceptional conditions. commTxPoolNormalCommon may indicate the resources by which the UE is allowed to transmit sidelink direct communication while in RRC_IDLE or when in RRC_CONNECTED while transmitting sidelink via a frequency other than the primary.

Listing 1.

```
-- ASN1START
SystemInformationBlockType18-r12 ::= SEQUENCE {
    commConfig-r12          SEQUENCE {
        commRxPool-r12              SL-CommRxPoolList-r12,
        commTxPoolNormalCommon-r12          SL-CommTxPoolList-r12   OPTIONAL,   -- Need OR
        commTxPoolExceptional-r12           SL-CommTxPoolList-r12   OPTIONAL, -- Need OR
        commSyncConfig-r12      SL-SyncConfigList-r12       OPTIONAL -- Need OR
    }                       OPTIONAL, -- Need OR
    lateNonCriticalExtension            OCTET STRING  OPTIONAL,
    ...
}
-- ASN1STOP
```

For sidelink dedicated configuration, the UE may follow the procedure shown in Listing 2.

Listing 2.
1> if the RRCConnectionReconfiguration message includes the sl-CommConfig:
  2> if commTxResources is included and set to setup:
    3> from the next SC period use the resources indicated by commTxResources for sidelink direct communication transmission, as specified in 5.10.4;

2> else if commTxResources is included and set to release:
   3> from the next SC period, release the resources allocated for sidelink direct communication transmission previously configured by commTxResources;

The information element (IE) which is included in a UE-dedicated message, SL-CommConfig, may specify the dedicated configuration information for sidelink direct communication as shown in Listing 3. In particular it may concern the transmission resource configuration for direct communication on the primary frequency. commTxPoolNormalDedicated may indicate a pool of transmission resources the UE is allowed to use while in RRC_CONNECTED. commTxConfig may indicate a pool of resources for SC when E-UTRAN schedules Tx resources (i.e. when indices included in DCI format 5 indicate the actual data resources). Mcs may indicate the Modulation and Coding Scheme. If not configured, the selection of Modulation and Coding Scheme may be up to UE implementation. Scheduled may indicate the configuration for the case E-UTRAN schedules the transmission resources based on sidelink specific BSR from the UE. ue-Selected may indicate the configuration for the case the UE selects the transmission resources from a pool of resources configured by E-UTRAN.

Listing 3.

```
-- ASN1START
SL-CommConfig-r12 ::=      SEQUENCE {
  commTxResources-r12      CHOICE {
    release       NULL,
    setup         CHOICE {
      scheduled-r12        SEQUENCE {
        sl-RNTI-r12        C-RNTI,
        mac-MainConfig-r12        MAC-MainConfigSL-r12,
        commTxConfig-r12   SL-CommResourcePool-r12,
        mcs-r12       INTEGER (0..28)      OPTIONAL -- Need OP
      },
      ue-Selected-r12      SEQUENCE {
        -- Pool for normal usage
        commTxPoolNormalDedicated-r12 SEQUENCE {
          poolToReleaseList-r12        SL-TxPoolToReleaseList-r12 OPTIONAL, -- Need ON
          poolToAddModList-r12    SL-CommTxPoolToAddModList-r12 OPTIONAL -- Need ON
        }
      }
    }
  }      OPTIONAL, -- Need ON
  ...
}
SL-CommTxPoolToAddModList-r12  ::= SEQUENCE (SIZE (1..maxSL-TxPool-r12)) OF SL-CommTxPoolToAddMod-r12
SL-CommTxPoolToAddMod-r12 ::=  SEQUENCE {
  poolIdentity-r12     SL-TxPoolIdentity-r12,
  pool-r12     SL-CommResourcePool-r12
}
MAC-MainConfigSL-r12 ::=      SEQUENCE {
  periodic-BSR-TimerSL       PeriodicBSR-Timer-r12    OPTIONAL, -- Need ON
  retx-BSR-TimerSL     RetxBSR-Timer-r12
}
-- ASN1STOP
```

The IE SL-CommResourcePool may specify the configuration information for an individual pool of resources for sidelink direct communication. The IE may cover the configuration of both the sidelink control information and the data as shown in Listing 4. sc-Period may indicate the period over which resources allocated in a cell for SC, scheduled and UE selected data transmissions occur. Value in number of subframes. Value sf40 may correspond to 40 subframes, sf80 may correspond to 80 subframes and so on. E-UTRAN may configure values sf40, sf80, sf160 and sf320 for FDD and for TDD config 1 to 5, values sf70, sf140 and sf280 for TDD config 0, and finally values sf60, sf120 and sf240 for TDD config 6. syncConfigIndex may indicate the synchronisation configuration that is associated with a reception pool, by means of an index to the corresponding entry of commSyncConfig in SystemInformationBlockType18. tdd-Config may be TDD configuration associated with the reception pool of the cell indicated by syncConfigIndex. Absence of the field may indicate the same duplex mode as the cell providing this field and the same UL/DL configuration as indicated by subframeAssignment in SystemInformationBlockType1 in case of TDD. trpt-Subset may indicate the subset of T-RPT available. It may consist of a bitmap which is used to indicate the set of available 'k' values to be used for sidelink direct communication. If T-RPT subset configuration is not signaled or preconfigured then UE may assume the whole T-RPT set is available. The field Tx, which may be conditionally present, may be mandatory present when included in commTxPoolNormalDedicated, commTxPoolNormalCommon or commTxPoolExceptional. Otherwise the field may be not present.

Listing 4.

```
-- ASN1START
SL-CommTxPoolList-r12 ::=     SEQUENCE (SIZE (1..maxSL-TxPool-r12)) OF SL-CommResourcePool-r12
SL-CommRxPoolList-r12 ::=     SEQUENCE (SIZE (1..maxSL-RxPool-r12)) OF SL-CommResourcePool-r12
SL-CommResourcePool-r12 ::=     SEQUENCE {
  sc-CP-Len-r12     SL-CP-Len-r12,
  sc-Period-r12     SL-PeriodComm-r12,
  sc-TF-ResourceConfig-r12       SL-TF-ResourceConfig-r12,
  data-CP-Len-r12     SL-CP-Len-r12,
  dataHoppingConfig-r12       SL-HoppingConfigComm-r12,
  ue-SelectedResourceConfig-r12        SEQUENCE {
    data-TF-ResourceConfig-r12      SL-TF-ResourceConfig-r12,
    trpt-Subset-r12     SL-TRPT-Subset-r12    OPTIONAL -- Need OP
  }       OPTIONAL,      -- Need OR
  rxParametersNCell-r12      SEQUENCE {
    tdd-Config-r12     TDD-Config      OPTIONAL,   -- Need OP
    syncConfigIndex-r12      INTEGER (0..15)
  }       OPTIONAL,   -- Need OR
  txParameters-r12      SEQUENCE {
    sc-TxParameters-r12       SL-TxParameters-r12,
    dataTxParameters-r12      SL-TxParameters-r12
  }       OPTIONAL,      -- Cond Tx
  ...
}
SL-TRPT-Subset-r12 ::=      BIT STRING (SIZE (3..5))
-- ASN1STOP
```

For Sidelink pre-configured parameters, their value may be set as in Listing 5.

Listing 5

| Name | Value | Semantics description | Ver |
|---|---|---|---|
| preconfigSync | | | |
| >syncTxParameters | | | |
| >>alpha | 0 | | |
| preconfigComm | | | |
| >sc-TxParameters | | | |
| >>alpha | 0 | | |
| >dataTxParameters | | | |
| >>alpha | 0 | | |

The E UTRA definitions of pre-configured sidelink parameters may be described as in Listing 6. Upper layers are assumed to provide a set of pre-configured parameters that are valid at the current UE location if any.

Listing 6.

```
-- ASN1START
EUTRA-Sidelink-Preconf DEFINITIONS AUTOMATIC TAGS ::=
BEGIN
IMPORTS
    AdditionalSpectrumEmission,
    ARFCN-ValueEUTRA-r9,
    FilterCoefficient,
    maxSL-TxPool-r12,
    P-Max,
    SL-CP-Len-r12,
    SL-HoppingConfigComm-r12,
    SL-OffsetIndicatorSync-r12,
    SL-PeriodComm-r12,
    RSRP-RangeSL3-r12,
    SL-TF-ResourceConfig-r12,
    SL-TRPT-Subset-r12,
```

-continued

Listing 6.

```
    P0-SL-r12,
    TDD-ConfigSL-r12
FROM EUTRA-RRC-Definitions;
-- ASN1STOP
```

The IE SL-Preconfiguration may include the sidelink pre-configured parameters as shown in Listing 7. carrierFreq may indicate the carrier frequency for sidelink operation. In case of FDD it may be uplink carrier frequency and the corresponding downlink frequency can be determined from the default TX-RX frequency separation. preconfigComm may indicate a list of a number of individual resource pools. The same set of pools may be used for reception and transmission of sidelink direct communication. syncRefDiffHyst may be Hysteresis when evaluating a synchronization reference UE (SyncRef UE) using relative comparison. Value dB0 may correspond to 0 dB, dB3 to 3 dB and so on, value dBinf may correspond to infinite dB. syncRefMinHyst may be Hysteresis when evaluating a SyncRef UE using absolute comparison. Value dB0 may correspond to 0 dB, dB3 to 3 dB and so on.

Listing 7.

```
-- ASN1START
SL-Preconfiguration-r12 ::=        SEQUENCE {
    preconfigGeneral-r12            SL-PreconfigGeneral-r12,
    preconfigSync-r12               SL-PreconfigSync-r12,
    preconfigComm-r12                   SL-PreconfigCommPoolList4-r12,
    ...
}
SL-PreconfigGeneral-r12 ::=        SEQUENCE {
    -- PDCP configuration
    rohc-Profiles-r12               SEQUENCE {
        profile0x0001-r12               BOOLEAN,
        profile0x0002-r12               BOOLEAN,
        profile0x0004-r12               BOOLEAN,
        profile0x0006-r12               BOOLEAN,
        profile0x0101-r12               BOOLEAN,
        profile0x0102-r12               BOOLEAN,
        profile0x0104-r12               BOOLEAN
    },
    -- Physical configuration
    carrierFreq-r12                 ARFCN-ValueEUTRA-r9,
    maxTxPower-r12                  P-Max,
    additionalSpectrumEmission-r12  AdditionalSpectrumEmission,
    sl-bandwidth-r12                ENUMERATED {n6, n15, n25, n50, n75, n100},
    tdd-ConfigSL-r12                TDD-ConfigSL-r12,
    reserved-r12                    BIT STRING (SIZE (19)),
    ...
}
SL-PreconfigSync-r12 ::= SEQUENCE {
    syncCP-Len-r12                  SL-CP-Len-r12,
    syncOffsetIndicator1-r12        SL-OffsetIndicatorSync-r12,
    syncOffsetIndicator2-r12        SL-OffsetIndicatorSync-r12,
    syncTxParameters-r12            P0-SL-r12,
    syncTxThreshOoC-r12             RSRP-RangeSL3-r12,
    filterCoefficient-r12           FilterCoefficient,
    syncRefMinHyst-r12                  ENUMERATED {dB0, dB3, dB6, dB9, dB12},
    syncRefDiffHyst-r12                 ENUMERATED {dB0, dB3, dB6, dB9, dB12,
dBinf},
    ...
}
SL-PreconfigCommPoolList4-r12 ::=  SEQUENCE (SIZE (1..maxSL-TxPool-r12)) OF SL-
PreconfigCommPool-r12
SL-PreconfigCommPool-r12 ::=       SEQUENCE {
-- This IE is same as SL-CommResourcePool with rxParametersNCell absent
    sc-CP-Len-r12                   SL-CP-Len-r12,
    sc-Period-r12                   SL-PeriodComm-r12,
    sc-TF-ResourceConfig-r12        SL-TF-ResourceConfig-r12,
    sc-TxParameters-r12             P0-SL-r12,
    data-CP-Len-r12                 SL-CP-Len-r12,
    data-TF-ResourceConfig-r12      SL-TF-ResourceConfig-r12,
```

Listing 7.

```
dataHoppingConfig-r12      SL-HoppingConfigComm-r12,
dataTxParameters-r12       P0-SL-r12,
trpt-Subset-r12            SL-TRPT-Subset-r12,
...
}
END
-- ASN1STOP
maxSL-TxPool-r12    INTEGER ::= 4-- Maximum number of individual sidelink Tx
resource pools
```

FIG. 1 shows an example communications system 20 which is generally generic to embodiments described herein. In the example communications system 20 a radio access node 22 communicates over a first air or radio interface 24 (such as the Uu interface, for example) with first wireless terminal $26_1$. The node 22 comprises node processor 30 and node transmitter 32. The first wireless terminal $26_1$ comprises terminal processor 40 and terminal transceiver 42. The terminal transceiver 42 typically comprises terminal transmitter section 44 and terminal receiver section 46. The terminal transmitter section 44 may comprise terminal transmitter circuitry and may be known as "transmitter" ("TX"); the terminal receiver section 46 may comprise terminal receiver circuitry and may be known as "receiver" ("RX").

The technology disclosed herein provides techniques for allocating radio resources for use in sidelink direct (SL) communications. The "sidelink direct communication" encompasses one or both of sidelink signaling or control information and sidelink data. An example sidelink direct communication may occur, for example, between first wireless terminal $26_1$ and second wireless terminal 262, as indicated by arrow 48 of FIG. 1. The first wireless terminal $26_1$ and second wireless terminal 262, may communicate over a second radio interface 49, which may also be known as the PC5 interface. The PC5 interface is described in 3GPP TS 23.303, 3GPP TS 23.303 V12.0.0 (2014-02); 3rd Generation Partnership Project, Technical Specification Group Services and System Aspects; Proximity-based services (ProSe); Stage 2; Release 12, which is incorporated herein by reference in its entirety.

To facilitate participation of the first wireless terminal $26_1$ in sidelink direct communications the terminal processor 40 includes sidelink direct (SLD) logic 50. The SLD logic 50 comprises instructions stored on non-transitory media which, when executed, enable first wireless terminal $26_1$ to perform applications germane to sidelink direct communications, including selecting and/or utilizing radio resources for the transmitting and/or receiving of sidelink direct communications, such as sidelink direct signaling and sidelink direct data. The terminal processor 40 may perform operations of the first wireless terminal $26_1$ other than those involved in sidelink direct communications, such as operations pertaining to transmitting and receiving other types of communications and executing applications stored in memory of the first wireless terminal $26_1$.

In at least some example embodiments and modes, node 22 and first wireless terminal $26_1$ communicate with each other across radio interface 24 using a radio resource. Similarly, first wireless terminal $26_1$ and second wireless terminal 262 communicate across radio interface 49 using a radio resource (i.e., another radio resource).

Figure 2:
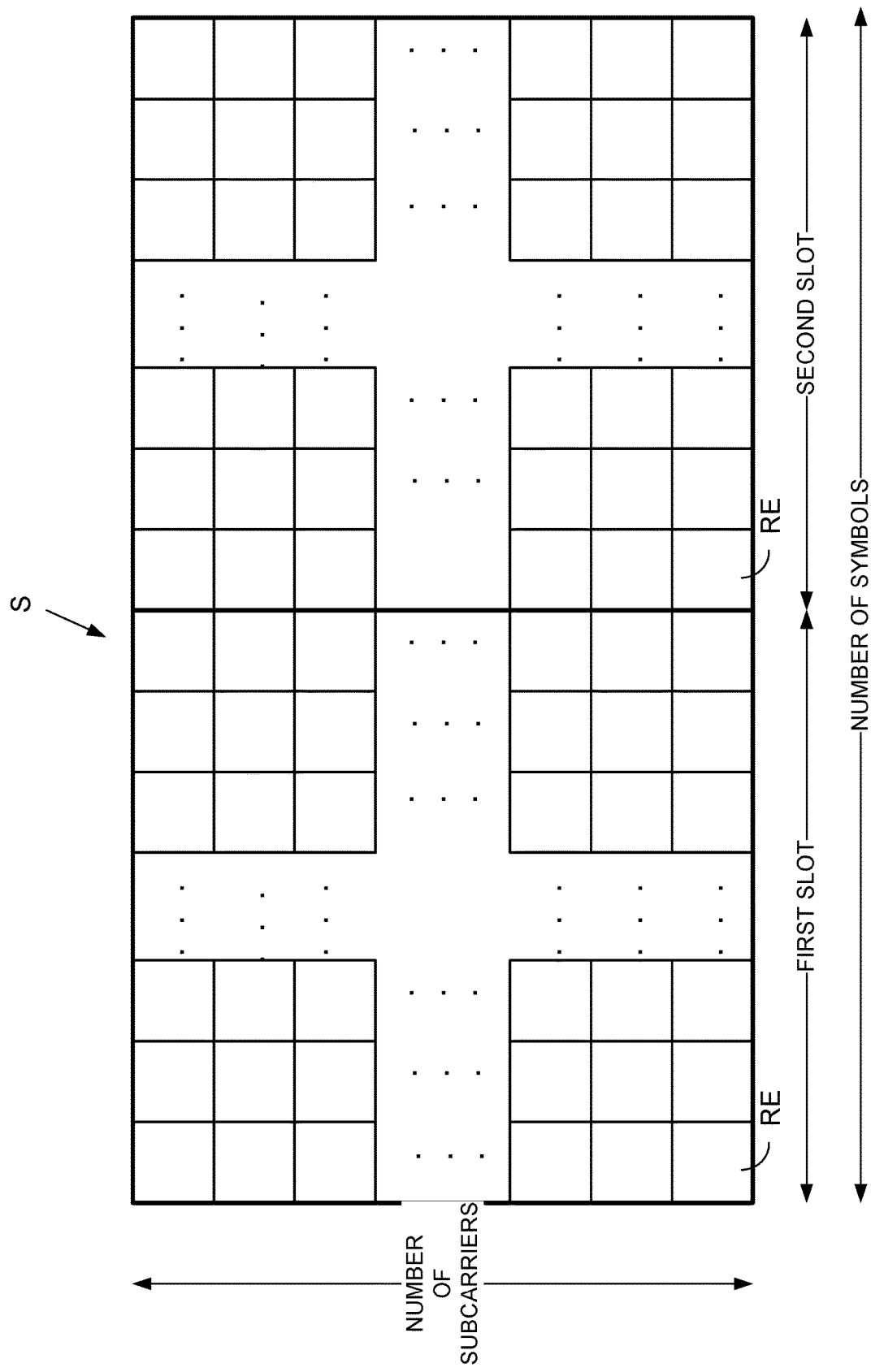
FIG. 2 is a diagrammatic view of an example subframe suitable for use in a sidelink direct communications.

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared by a node such as node 22, e.g., by a scheduler of node 22. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. A representative, sample depiction of a subframe S according to an example implementation is shown in FIG. 2. In the time domain, each LTE subframe is divided into two slots (so that there are thus 20 slots in a frame). The transmitted signal in each slot is described by a resource grid comprised of resource elements (RE). Each column of the two dimensional grid of FIG. 2 represents a symbol (e.g., an OFDM symbol on downlink (DL) from node to wireless terminal; an SC-FDMA symbol in an uplink (UL) frame from wireless terminal to node). Each row of the grid of FIG. 2 represents a subcarrier. A resource element (RE) is the smallest time-frequency unit for downlink transmission in the subframe S. That is, one symbol on one sub-carrier in the sub-frame comprises a resource element (RE) which is uniquely defined by an index pair (k,l) in a slot (where k and/are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

The frame and subframe structure of FIG. 2 serves only as an example a radio resource and of a technique of formatting of information that is to be transmitted over a radio or air interface. It should be understood that "frame" and "subframe" are not to be limited by the specific description of FIG. 2.

The technology disclosed herein provides various techniques, apparatus, and method for allocating resources for sidelink direct communication. In an example embodiment and mode, a user equipment (UE) comprises a processor and a memory in electronic communication with the processor. Instructions stored in the memory are executable to receive a configuration of first resource pools, and to perform a sidelink communication using the first resource pools. The first resource pools consist of second resource pools and additional resource pools, and the second resource pools are available for UEs for which the additional resource pools are not available. A method in a user equipment (UE) comprises receiving a configuration of first resource pools; and performing a sidelink communication using the first resource pools. In the method the first resource pools consist of second resource pools and additional resource pools, and the second resource pools are available for UEs for which the additional resource pools are not available In accordance with its generic collision avoidance capability the terminal processor 40 is shown as comprising resource allocation controller 52. In at least one example embodiment, resource allocation controller 52 may comprise or be subsumed in terminal processor 40, and particularly may comprise or be subsumed in SLD logic 50. Accordingly, resource allocation controller 52 is also known as resource allocation processor 52, or simply "processor". The resource allocation controller 52 may take the form of various controllers 52A-52C described herein in correspondence to the various collision avoidance or pre-emption techniques herein described and implemented thereby.

It will be appreciated that the sidelink direct communications may be initiated or prompted by one or more applications that are executed by terminal processor 40 of first wireless terminal $26_1$. Accordingly, FIG. 1 shows terminal processor 40 as executing instructions of an application 54. The instructions comprising application 54 are stored in non-transitory memory and, when executed, may invoke, initiate, or otherwise participate in sidelink direct communications.

Resource Allocation with Collision Avoidance Facilitated by Resource Pool Structure In one of its aspects the technology disclosed herein, collision avoidance is facilitated by method and apparatus which provide a non-nominal resource pool structure which is configured to facilitate quality of service (QoS) requirements. In other words, the resource structure provided by the technology disclosed herein and known as the non-nominal resource pool structure has finer granularity than the number of resource pools specified by a nominal resource pool quantity parameter.

A certain set of pre-configured parameters, which set is valid at the current location of a wireless terminal, is to be provided to a wireless terminal engaging in the UE autonomous resource selection mode. The set of pre-configured parameters may be provided by upper layers, e.g., by an application such as application 54 executed by the wireless terminal that is above the Access Stratum (AS) layers of sidelink direct application (e.g., SLD logic 50) executed by the wireless terminal. "Upper layer" normally refers to NAS (Non Access Stratum) layers, e.g., above RRC layers in terms of control plane, which means the transparent signaling transfer between UE and core network (without AS layer communications via eNB).

Among such pre-configured parameters is a nominal resource pool quantity parameter in the form of an integer which specifies a predetermined number of resource pools included in the resource pool information provided to the wireless terminal. The nominal resource pool quantity parameter is said to be "nominal" in the sense that it is specified by a particular industry standard document, or particular version/release of an industry standard document. The resource pools specified by the nominal resource pool quantity parameter are referred to herein as "nominal resource pools". An example of the nominal resource pool quantity parameter is the parameter maxSL-TxPool-r12. The parameter maxSL-TxPool-r12 has the integer value "4", so that there are four nominal resource pools comprising the resource pool information.

Figure 1A:
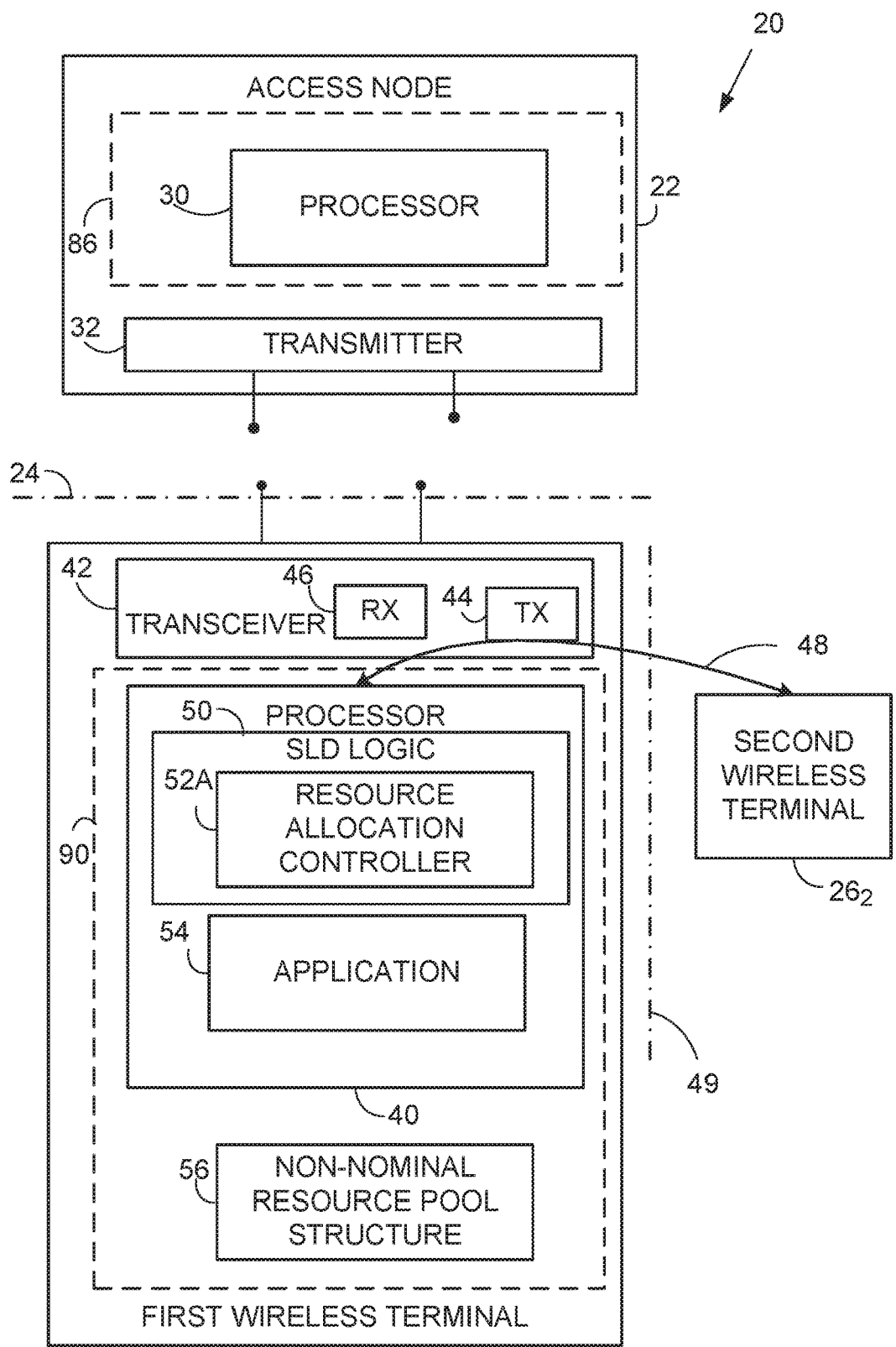
FIG. 1A is a schematic view of an example embodiment of a radio communications network which avoids collision when allocating resources for sidelink direct communication through provision of a non-nominal resource pool structure.

According to one aspect of the technology disclosed herein, methods and apparatus are provided for receiving information about and using a resource pool structure, i.e., a non-nominal resource pool structure, which is different from that specified by the nominal resource pool quantity parameter. The information about the non-nominal resource pool structure is generically referred to herein as a "non-nominal pool quantity parameter". FIG. 1A depicts such aspect of the technology, showing resource allocation controller 52A as accessing non-nominal resource pool structure 56. The non-nominal resource pool structure 56 may be stored in a memory device, such as a random access memory (RAM), cache memory, or read only memory (ROM), for example.

Figure 3:
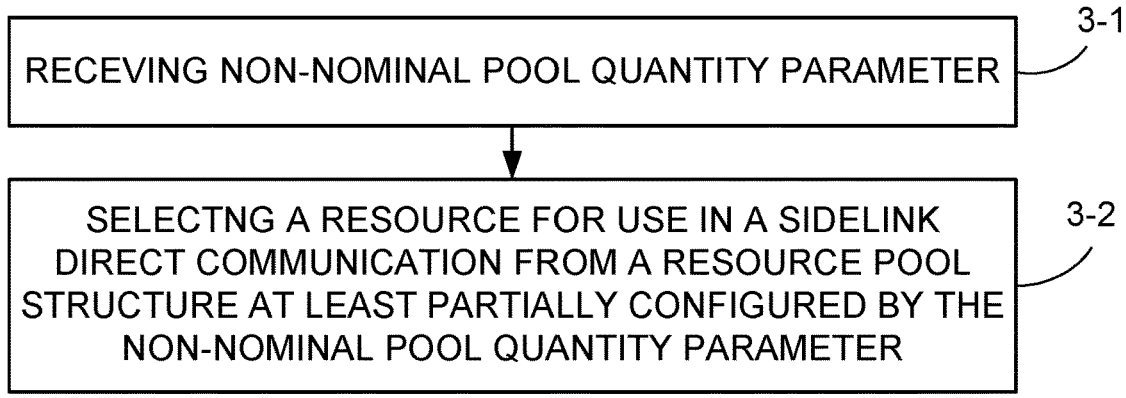
FIG. 3 is a flowchart showing basic, representative acts or steps comprising a method of operating a wireless terminal which uses non-nominal resource pool structure

FIG. 3 shows basic, representative acts or steps comprising a method of operating a wireless terminal which uses non-nominal resource pool structure 56. The method of FIG. 3 involves executing, on processor circuitry of the wireless terminal (e.g., terminal processor 40 including resource allocation controller 52A), sidelink direct instructions stored on non-transitory media configured to perform a sidelink direct communication with another wireless terminal. The acts of FIG. 3 comprise act 3-1 and act 3-2. Act 3-1 comprises receiving a non-nominal pool quantity parameter which specifies a greater number of graduations of pooled resources than is defined by a nominal resource pool quantity parameter. As used herein, "resource" means "radio resource" (e.g., time and frequency resources), and "pooled resources" means "pooled radio resources". Act 3-2 comprises, in conjunction with execution of the sidelink direct instructions, the processor circuitry selecting a resource for use in the sidelink direct communication from a resource pool structure at least partially configured (e.g., at least partially defined) by the non-nominal pool quantity parameter.

Thus, in the example embodiment and mode of FIG. 3, the processor circuitry of terminal processor 40 (e.g., SLD logic 50 including resource allocation controller 52) is configured, in conjunction with performance of a sidelink direct communication with another wireless terminal, (1) to receive a non-nominal pool quantity parameter which specifies a greater number of graduations of pooled radio resources than is defined by a nominal resource pool quantity parameter; and, (2) to select a resource for use in the sidelink direct communication from a resource pool structure at least partially configured by the non-nominal pool quantity parameter. The terminal transmitter circuitry 44 is configured to use the selected resource in the sidelink direct communication.

In an example embodiment and mode the technology disclosed herein comprises receipt and use of a sub-pool quantity parameter as the non-nominal pool quantity parameter. The sub-pool quantity parameter specifies a number of sub-pools which comprises one or more, and preferably each, of the nominal pools. The sub-pool quantity parameter is used in conjunction with the nominal resource pool quantity parameter to at least partially configure or define a resource pool structure different than that indicated by the resource pool quantity parameter alone. By providing sub-pools specified by the sub-pool quantity parameter, finer and more delineations can be made between resource groupings, and thus providing more graduations of resource pool choice and thereby lowering collision probability.

Figure 4A:
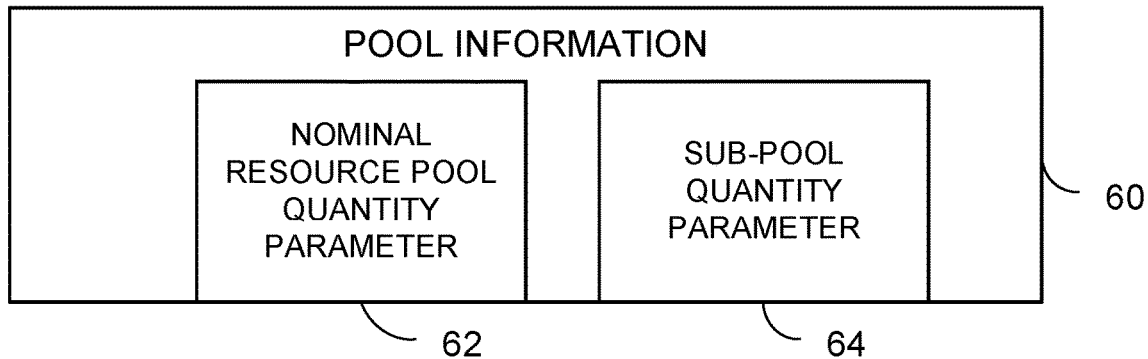
FIG. 4A is a diagrammatic view showing pool information which comprises a nominal resource pool quantity parameter and a sub-pool quantity parameter.
Figure 4B:
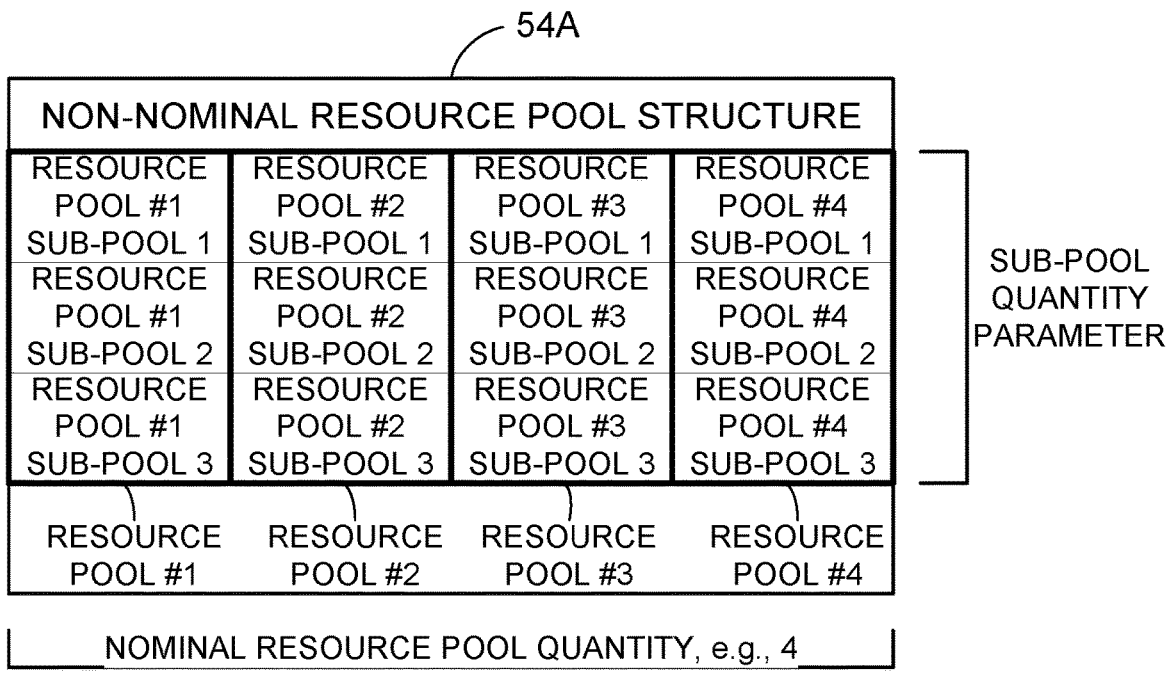
FIG. 4B is a diagrammatic view of a non-nominal resource pool structure configured in accordance with the pool information of the type of FIG. 4A.

In the above regard, FIG. 4A illustrates pool information 60 which comprises nominal resource pool quantity parameter 62 and sub-pool quantity parameter 64. FIG. 4B shows an example non-nominal resource pool structure 56A configured in accordance with the pool information of the type of FIG. 4A, for an example scenario in which the nominal resource pool quantity parameter 62 has a value of "4" and the sub-pool quantity parameter 64 has a value of "3". The number "4" may be used for the nominal resource pool quantity parameter 62. But, it is conceivable that such number may change and thus the nominal resource pool quantity parameter 62 is not so limited. The value of the sub-pool quantity parameter 64 is not limited to "3", but may be a greater or lesser amount. The sub-pool quantity parameter 64 may apply for all resource pools, e.g., each of the resource pools may have the same number of sub-pools, or there may be a different sub-pool quantity parameter 64 for different resource pools, such as a different sub-pool quantity parameter 64 for each resource pool.

Figure 3A:
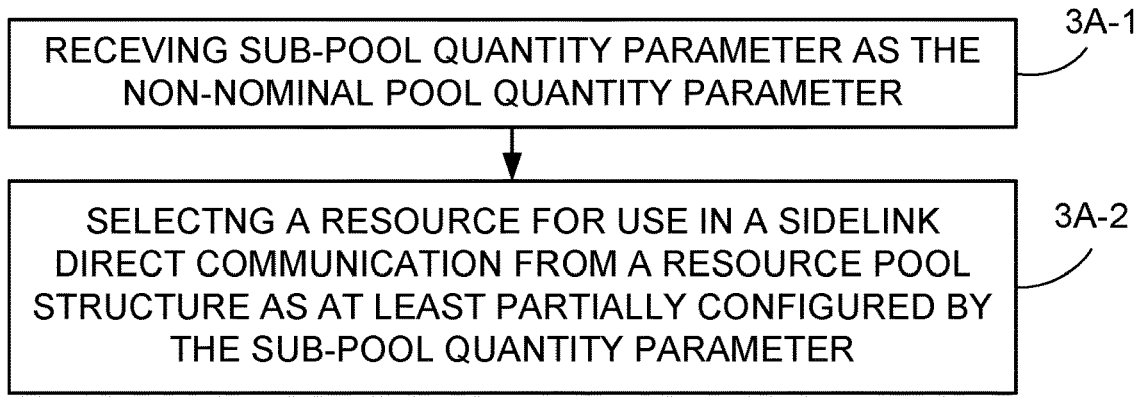
FIG. 3A is a flowchart showing basic, representative acts or steps comprising a method of operating a wireless terminal which uses a sub-pool quantity parameter as a non-nominal pool quantity parameter.

FIG. 3A shows example, representative acts or steps that may be performed by the wireless terminal of FIG. 1A upon receipt and use of a sub-pool quantity parameter as the non-nominal pool quantity parameter. Act 3A-1 comprises receiving a sub-pool quantity parameter as the non-nominal pool quantity parameter. The sub-pool quantity parameter specifies a number of sub-pools which comprise one or more of nominal resource pools available for resource selection as defined by a nominal resource pool quantity parameter. Act 3A-2 comprises the processor circuitry, on the basis of priority of the sidelink direct communication and in conjunction with execution of the sidelink direct instructions, selecting a resource for use in the sidelink direct communication from a resource pool structure at least partially configured (e.g., at least partially defined) by the sub-pool quantity parameter. As an example, the resource pool structure may be at least partially configured by the nominal resource pool quantity parameter and the sub-pool quantity parameter.

In an example implementation, the method of FIG. 3A may further comprise receiving the sub-pool quantity parameter from an application (such as application 54) executing on the processor at a higher layer than the sidelink direct instructions.

Thus, in the example embodiment and mode of FIG. 3A, the processor circuitry of terminal processor 40 (e.g., SLD logic 50 including resource allocation controller 52) is configured: (1) to receive a sub-pool quantity parameter as the non-nominal pool quantity parameter (the sub-pool quantity parameter specifying a number of sub-pools which comprise one or more of nominal resource pools available for resource selection as defined by a nominal resource pool quantity parameter); and (2) on the basis of priority of the sidelink direct communication and in conjunction with execution of the sidelink direct instructions, to select a resource for use in the sidelink direct communication from a resource pool structure at least partially configured by the sub-pool quantity parameter In another example embodiment and mode the technology disclosed herein comprises receipt and use of an override pool quantity parameter which specifies a number of pools which replaces a number of pools indicated by the nominal resource pool quantity parameter. For example, the override pool quantity parameter may specify, for embodiments or releases subsequent to an earlier specification or earlier release, a greater number of resource pools available for sidelink direct communication than was specified in the earlier specification or earlier release. As an example illustration, the parameter maxSL-TxPool-r12 may have the integer value "4" and the override pool quantity parameter may have an integer value of "16", or another integer greater than "4". The override pool quantity parameter may either replace or include the nominal resource pool quantity parameter in a communication received from a higher layer. By providing the override pool quantity parameter, the number of resource pools is increased and thus the increase of resource pool choice, thereby lowering collision probability.

Figures 5A, 5B:
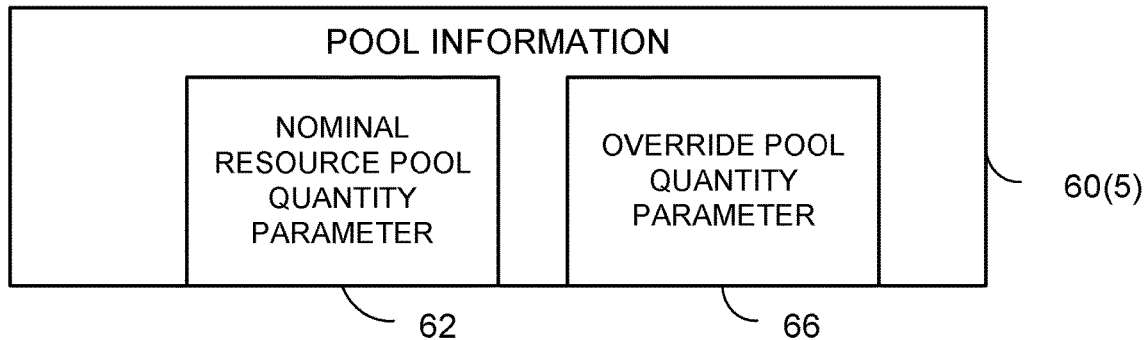
FIG. 5A is a diagrammatic view showing pool information which comprises a nominal resource pool quantity parameter and an override pool quantity parameter.
FIG. 5B is a diagrammatic view of a non-nominal resource pool structure configured in accordance with the pool information of the type of FIG. 5A.

In the above regard, FIG. 5A illustrates pool information 60(5) which comprises nominal resource pool quantity parameter 62 and override pool quantity parameter 66. FIG. 5B shows an example non-nominal resource pool structure 56B configured in accordance with the pool information of the type of FIG. 5A, for an example scenario in which the nominal resource pool quantity parameter 62 has a value of "4" and the override pool quantity parameter 66 has a value of "16". The number "4" may be used for the nominal resource pool quantity parameter 62. It is conceivable that such number may change and thus the nominal resource pool quantity parameter 62 is not so limited. The value of the override pool quantity parameter 66 is not limited to "16", but may be a greater or lesser amount.

Figure 3B:
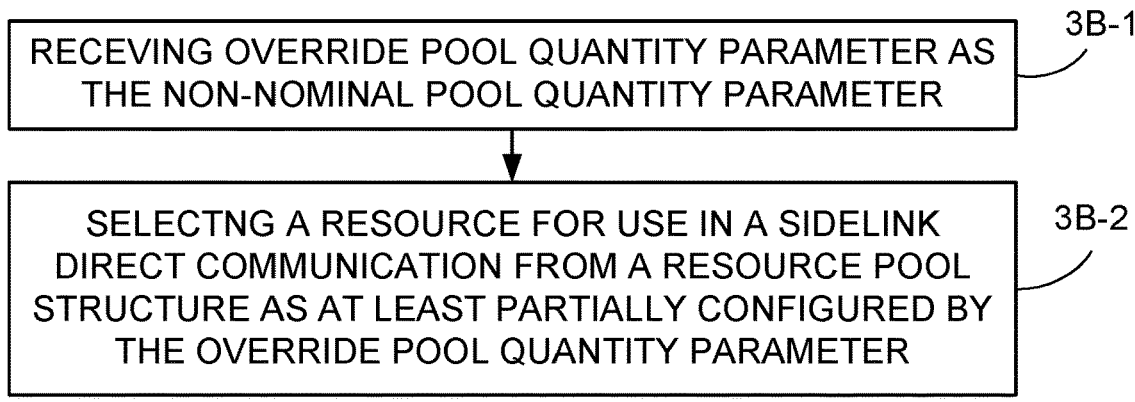
FIG. 3B is a flowchart showing basic, representative acts or steps comprising a method of operating a wireless terminal which uses an override pool quantity parameter as a non-nominal pool quantity parameter.

FIG. 3B shows example, representative acts or steps that may be performed by the wireless terminal of FIG. 1A upon receipt and use of an override pool quantity parameter 66 as the non-nominal pool quantity parameter. Act 3B-1 comprises receiving an override pool quantity parameter 66 as the non-nominal pool quantity parameter. Act 3B-2 comprises, on the basis of priority of the sidelink direct communication and in conjunction with execution of the sidelink direct instructions, the processor circuitry selecting a resource for use in the sidelink direct communication from a resource pool structure at least partially configured (e.g., at least partially defined) by the override pool quantity parameter rather than by a nominal resource pool quantity parameter.

Thus, in the example embodiment and mode of FIG. 3A, the processor circuitry of terminal processor 40 (e.g., SLD logic 50 including resource allocation controller 52) is configured: (1) to receive an override pool quantity parameter as the non-nominal pool quantity parameter (the override pool quantity parameter specifying a number resource pools available for resource selection); and (2) on the basis of priority of the sidelink direct communication and in conjunction with execution of the sidelink direct instructions, to select a resource for use in the sidelink direct communication from a resource pool structure at least partially configured by the override pool quantity parameter rather than by a nominal resource pool quantity parameter.

In another example embodiment and mode the technology disclosed herein comprises receipt and use of both an override pool quantity parameter and a sub-pool quantity parameter. In such example embodiment and mode the sub-pool quantity parameter specifies a number of sub-pools which comprises one or more, and preferably each, of the pools specified by the override pool quantity parameter. In the above regard, FIG. 6A illustrates pool information 60(6) which comprises nominal resource pool quantity parameter 62, sub-pool quantity parameter 64, and override pool quantity parameter 66. FIG. 6B shows an example non-nominal resource pool structure 56C configured in accordance with the pool information of the type of FIG. 6A, for an example scenario in which the nominal resource pool quantity parameter 62 has a value of "4"; the sub-pool quantity parameter 64 has a value of "2"; and the override pool quantity parameter 66 has a value of "8". As understood from the foregoing, the values for FIG. 6B are not limited to those shown, but may be a greater or lesser amount.

If it is assumed that the nominal resource pool quantity parameter is "maxSL-TxPool-r12" and has a value of "4", in an example embodiment and mode of the technology disclosed herein, and when resource pool allocation/access is associated with the priority, any of the following techniques may be utilized:

(1) maxSL-TxPool-r12 is reused without any modification;

(2) maxSL-TxPool-r12 is reused; another parameter such as nominal resource pool quantity parameter 62 (which may be called "maxSL-TxSubPool") is defined to specify in each of the four resource pools how many sub-pools can be defined;

(3) maxSL-TxPool-r12 is replaced by another similar parameter, e.g., override pool quantity parameter 66 (which may be called "maxSL-TxPool"), which defines more sidelink transmission resource pools, e.g., 16 SL transmission resource pools.

(4) Both the sub-pool quantity parameter 64 (e.g., "maxSL-TxSubPool") and the override pool quantity parameter 66 (e.g., "maxSL-TxSubPool") may be provided or defined so as to satisfy more QoS requirements The names of the above new defined parameters are the ones used in this disclosure; they could be any other names if necessarily.

Figure 1B:
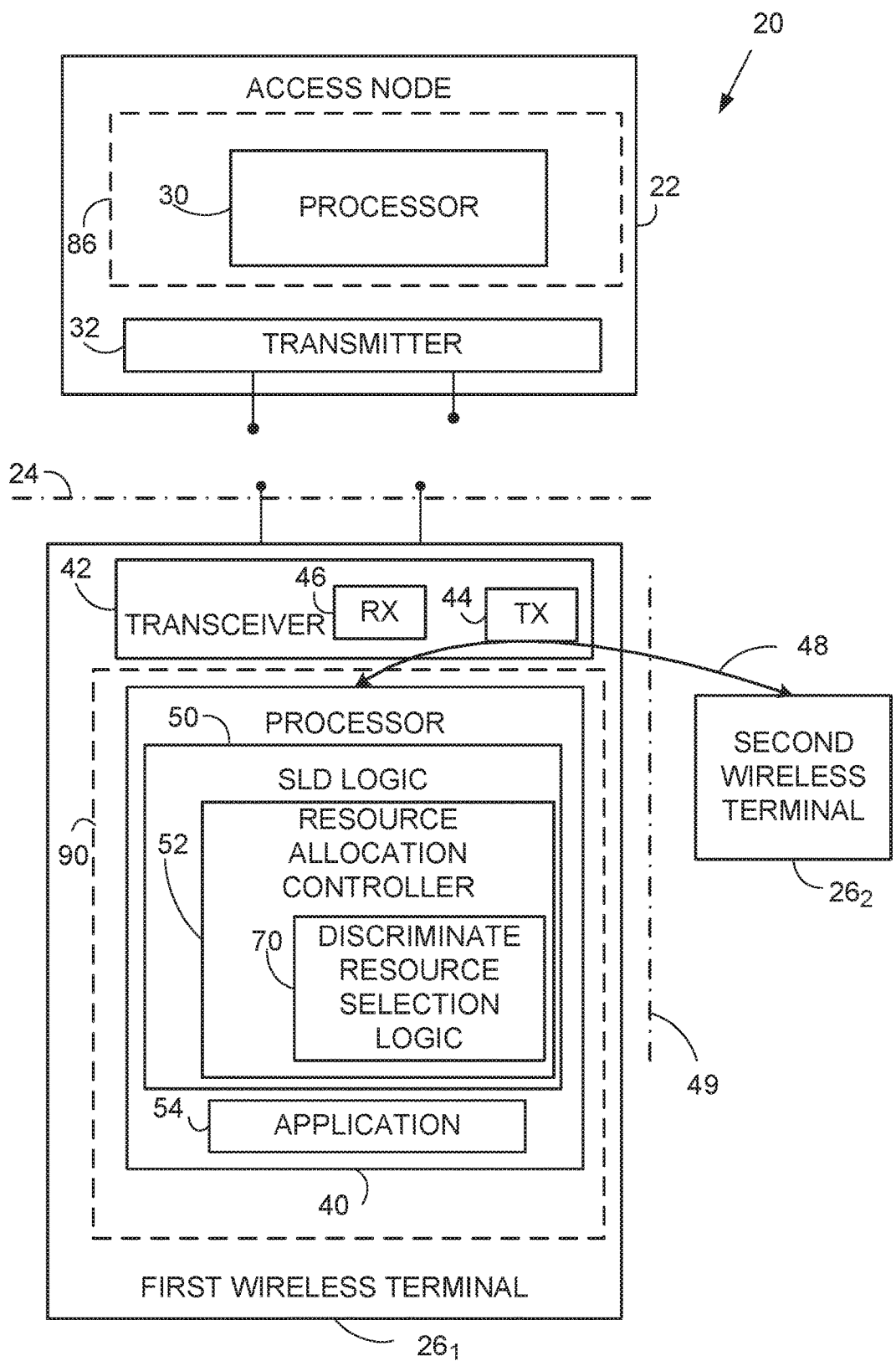
FIG. 1B is a schematic view of an example embodiment of a radio communications network which avoids collision using discriminate selection of resources for sidelink direct communication.

Resource Allocation with Collision Avoidance Facilitated by Discriminate Resource Selection In another aspect of the technology disclosed herein, collision avoidance is facilitated by method and apparatus which provide discriminate rather than random resource selection from a selected resource pool. As used herein, "discriminate" resource selection from a selected resource pool is selection by any criteria that distinguishes between member resources of a resource pool, and thus is not random resource selection. FIG. 1B shows an example embodiment and mode wherein terminal processor 40 of first wireless terminal 26$_1$ wherein resource allocation controller 52B comprises discriminate resource selection logic 70. The discriminate resource selection logic 70 thus comprises or is subsumed by terminal processor 40, and may also be referred to as "processor" or "processor circuitry".

Figure 7:
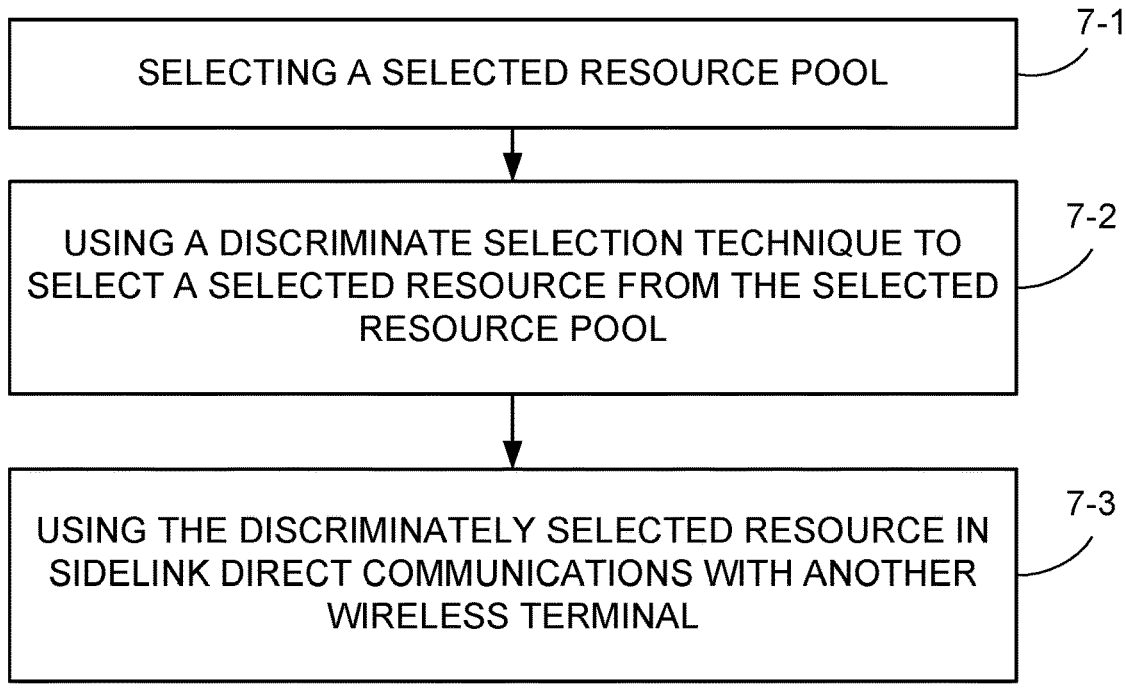
FIG. 7 is a flowchart showing example, representative acts or steps that may be performed by the wireless terminal of FIG. 1C in a generic method of discriminate selection of resources for sidelink direct communication.

FIG. 7 shows example, representative acts or steps that may be performed by the wireless terminal of FIG. 1B in a generic method of discriminate resource selection. The method of FIG. 7 may be executed on processor circuitry of first wireless terminal 26$_1$, e.g., on terminal processor 40 including discriminate resource selection logic 70 by executing instructions stored on non-transitory media. The basic acts of FIG. 7 comprising such execution are shown as act 7-1 through act 7-3. Act 7-1 comprises selecting a selected resource pool. Act 7-2 comprises using a discriminate selection technique (rather than random selection) to select a selected resource from the selected resource pool. Act 7-3 comprises using the discriminately selected resource in conjunction with sidelink direct communications with another wireless terminal.

Thus, in the example embodiment and mode of FIG. 1B and FIG. 7, the terminal processor 40 including discriminate resource selection logic 70 is configured to: (1) select a selected resource pool; and (2) use a discriminate selection technique to select a selected resource from the selected resource pool. The terminal transmitter circuitry 44 is configured to use the selected resource in conjunction with sidelink direct communications with another wireless terminal.

Figure 8:
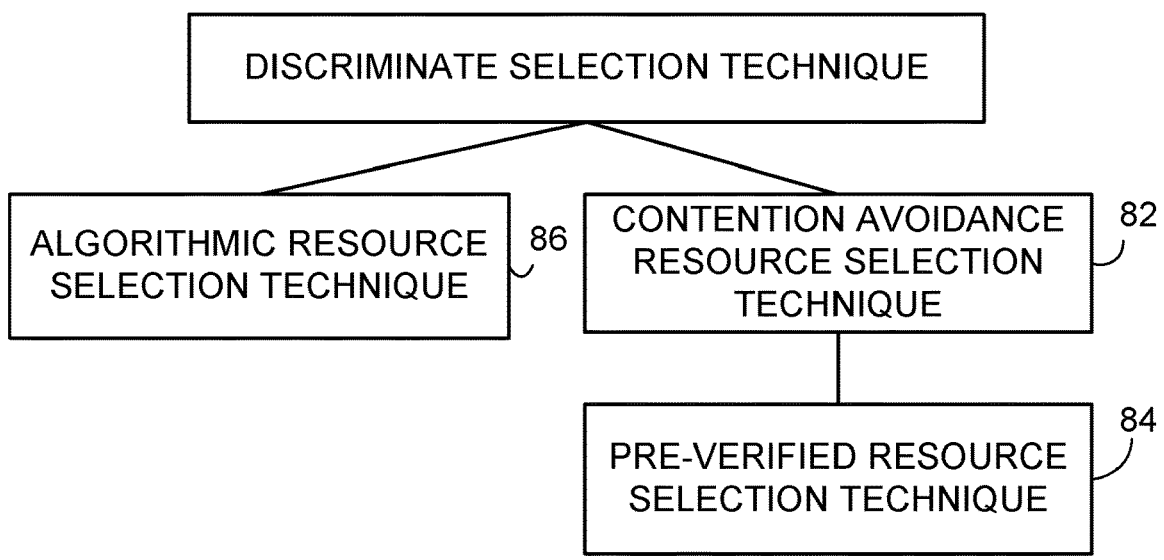
FIG. 8 is a diagrammatic view of different example embodiments and modes of discriminate resource selection including contention avoidance resource selection; pre-verified resource selection; and algorithmic resource selection.

Different example embodiment and modes of discriminate resource selection are illustrated in tree form in FIG. 8. Such examples, each discussed separately below, include contention avoidance resource selection 82; pre-verified resource selection 84; and algorithmic resource selection 86.

One example embodiment and mode of discriminate resource selection comprises contention avoidance resource selection (see contention avoidance resource selection 82 in FIG. 8). After a resource pool is selected, instead of randomly selecting resources within the resource pool, using the contention avoidance resource selection technique the wireless terminal selects resources within the selected resource pool according to a contention-based access method. The contention-based access method may be able to detect congestion/collision. Examples of such contention-based access methods include some "listen before talk" access methods, e.g., Randomized RPT selection (RRPT) and Carrier Sense Multiple Access with Collision Avoidance (CSMA/SA). It should be noted that methods such as CSMA may require receiver response in order to detect collision. When the discriminate resource selection technique (including but not limited to the contention avoidance resource selection technique) described herein is utilized to select a resource from a priority-associated resource pool, the technique is also referred to herein as "modified priority-based resource pool access".

When the contention based access method is used to detect congestion/collision before allocation for use in the sidelink direct communication, and a selected resource of the resource pool is proven before use to be sufficiently congestion/collision free, the technique is also known as a pre-verified resource selection technique (see pre-verified resource selection 84 in FIG. 8).

In an example implementation of the contention based access method, after selection of a resource pool the wireless terminal tentatively selects an initial candidate resource within the selected resource pool. The tentative selection of initial candidate resource may be a random selection, but unlike the prior art the initial candidate resource is not immediately used for sidelink direct communications. Rather, the wireless terminal sends out signaling, e.g., polling, to determine whether the initial candidate resource is in use in proximity to the wireless terminal, and if in use to optionally determine the priority of such existing use. Other wireless terminals polled or queried during the investigation for the candidate resource should respond or acknowledge if the resource is in use, or at least acknowledge that the candidate resource is idle from their perspective. If the wireless terminal determines as a result of such investigation/polling that the candidate resource is free, e.g., is not congested, then the wireless terminal may use the initial candidate resource as the definitively selected resource for the sidelink direct communications. But if the investigation/polling indicates that the candidate resource is congested or encumbered, then the wireless terminal may choose another resource to serve as the candidate resource, and may repeat the investigation/polling with respect to the second/another candidate resource, and so on until a definitive resource can be selected for the sidelink direct communications. Thus, selection of the resource using the contention based access method is not random, but rather the selection of resource results from pre-verified availability of the candidate resource.

In the contention avoidance resource selection modes and embodiments the particular resource of the selected resource pool which is evaluated for contention avoidance may be randomly selected for evaluation, but unlike a random resource selection mode (such as the common resource pool access) the evaluated resource is not selected for use in sidelink direct communications until after the resource has been qualified as acceptable, e.g., according to congestion/collision avoidance criteria. Thus, unlike the common resource pool access technique, in the contention avoidance resource selection modes and embodiments there is a discrimination based on a characteristic of the resource (e.g., lack of congestion).

Another example embodiment and mode of discriminate resource selection comprises algorithmic resource selection (see algorithmic resource selection 86 in FIG. 8). After a resource pool is selected, instead of randomly selecting resources within the resource pool, using the algorithmic resource selection employs some type of non-random or pseudo-random algorithm to select one of the resources of the selected pool. For example, using the algorithmic resource selection technique the wireless terminal may select the third resource of the selected resource pool, or alternatively the fifth resource of the selected resource pool. Moreover, if the first chosen resource of the selected resource pool (e.g., the third resource) should fail, the algorithmic resource selection technique may hop to another resource member of the resource pool, e.g., by incrementing by a particular constant. For example, if the first chosen resource of the selected resource is the third resource and the third resource of the pool should fail (e.g., before use in pre-evaluation or after actual use in the sidelink direct communication), the wireless terminal may increment a resource pointer by (for example) the number three, so that the sixth resource member of the selected resource pool will next be chosen.

It will be remembered from the foregoing that when the discriminate resource selection technique (including but not limited to the contention avoidance resource selection technique) described herein is utilized to select a resource from a priority-associated resource pool, the technique is also referred to herein as "modified priority-based resource pool access". The priority-based resource pool access and modified priority-based resource pool access methods may apply to none, or one, or some, or all of the cases, which are the cases in which the wireless terminal is either in the common case or in the exceptional case, where resource pools are indicated by dedicated signaling, or SIB 18, or pre-configuration.

In more detail, a wireless terminal capable of sidelink direct communication that is configured by upper layers to transmit sidelink direct communication and has related data to be transmitted may:
1> if the conditions for sidelink operation are met:
  2> if in coverage on the frequency used for sidelink direct communication:
    3> if the UE is in RRC_CONNECTED and uses the PCell for sidelink direct communication: representing the in coverage cases: Mode 1, or Mode 1 but fall back to exceptional case with SIB 18 indicating exception case resource pool, or Mode 2 with dedicated signalling indicating resource pool:
      4> following Procedure A, including common resource pool access; or following Procedure A, except using the priority-based resource pool access; or following Procedure A, except using the modified priority-based resource pool access.
    3> else (i.e. sidelink direct communication in RRC_IDLE or on cell other than PCell in RRC_CONNECTED): representing the in coverage cases: Mode 2 with SIB 18 indicating resource pool, or Mode 2 without SIB 18 indicating normal case resource pool and fall back to exceptional case with SIB 18 indicating exception case resource pool:
      4> following Procedure A, including common resource pool access; or following Procedure A, except using the priority-based resource pool access; or following Procedure A, except using the modified priority-based resource pool access.
  2> else (i.e. out of coverage on sidelink carrier): representing the out of coverage cases: pre-configured resource pool:
    3> configure lower layers to transmit the sidelink control information and the corresponding data using the pool of resources that were preconfigured; following Procedure A, including common resource pool access; or following Procedure A, except using the priority-based resource pool access; or following Procedure A, except using the modified priority-based resource pool access.

Procedure A may be defined in Listing 8.
Listing 8.
the wireless terminal may:
1> if the conditions for sidelink operation are met:
  2> if in coverage on the frequency used for sidelink direct communication:
    3> if the UE is in RRC_CONNECTED and uses the PCell for sidelink direct communication:
      4> if the UE is configured, by the current PCell/the PCell in which physical layer problems or radio link failure was detected, with commTxResources set to scheduled:
        5> if T310 or T311 is running; and if the PCell at which the UE detected physical layer problems or radio link failure broadcasts SystemInformationBlockType18 including commTxPoolExceptional; or
        5> if T301 is running and the cell on which the UE initiated connection re-establishment broadcasts SystemInformationBlockType18 including commTxPoolExceptional:
          6> configure lower layers to transmit the sidelink control information and the corresponding data using the pool of resources indicated by the first entry in commTxPoolExceptional;
        5> else:
          6> configure lower layers to request E-UTRAN to assign transmission resources for direct communication;
      4> else if the UE is configured with commTxPoolNormalDedicated:
        5> configure lower layers to transmit the sidelink control information and the corresponding data using the pool of resources indicated by the first entry in commTxPoolNormalDedicated;

3> else (i.e. sidelink direct communication in RRC_IDLE or on cell other than PCell in RRC_CONNECTED):
  4> if the cell chosen for sidelink direct communication transmission broadcasts SystemInformationBlockType18:
    5> if SystemInformationBlockType18 includes commTxPoolNormalCommon:
      6> configure lower layers to transmit the sidelink control information and the corresponding data using the pool of resources indicated by the first entry in commTxPoolNormalCommon;
    5> else:
      6> if the last connection establishment was initiated to request sidelink direct communication transmission resources and resulted in T300 expiry; and
      6> if the cell on which the UE initiated connection establishment broadcasts SystemInformationBlockType18 including commTxPoolExceptional:
        7> from the moment T300 expired, until receiving an RRCConnectionReconfiguration including sl-CommConfig or until receiving an RRCConnectionRelease or an RRCConnectionReject;
        8> configure lower layers to transmit the sidelink control information and the corresponding data using the pool of resources indicated by the first entry in commTxPoolExceptional;
2> else (i.e. out of coverage on sidelink carrier):
  3> configure lower layers to transmit the sidelink control information and the corresponding data using the pool of resources that were preconfigured i.e. indicated by the first entry in preconfigComm in SL-Preconfiguration and in accordance with the timing of the selected SyncRef UE, or if the UE does not have a selected SyncRef UE, based on the UEs own timing;

Resource Allocation with Terminal-Controlled Resource Pre-Emption

Collision avoidance as implemented in techniques such as those described above is intended to avoid resource pre-emption. Resource pre-emption generally is implemented only when collision occurs or is likely to occur. So typically pre-emption should be performed as a last step for resource access, since pre-emption signifies that collision cannot be avoided or has unacceptable probability not being able to be avoided if some resource access has to be guaranteed.

In another aspect of the technology disclosed herein, under control of a wireless terminal a high priority sidelink direct communication is able to pre-empt resources used for transmission by a low priority sidelink direct communication. In other words, different from eNB central node control of allocation of resources, the wireless terminal performs resource pre-emption with respect to resources utilized by the wireless terminal or another wireless terminal for sidelink direct communication, e.g., performs pre-emption with respect to resources selected by the wireless terminal in the UE autonomous resource selection mode. Pre-emption is an act of terminating on-going calls in order to free up resources for a higher priority call request.

Figure 1C:
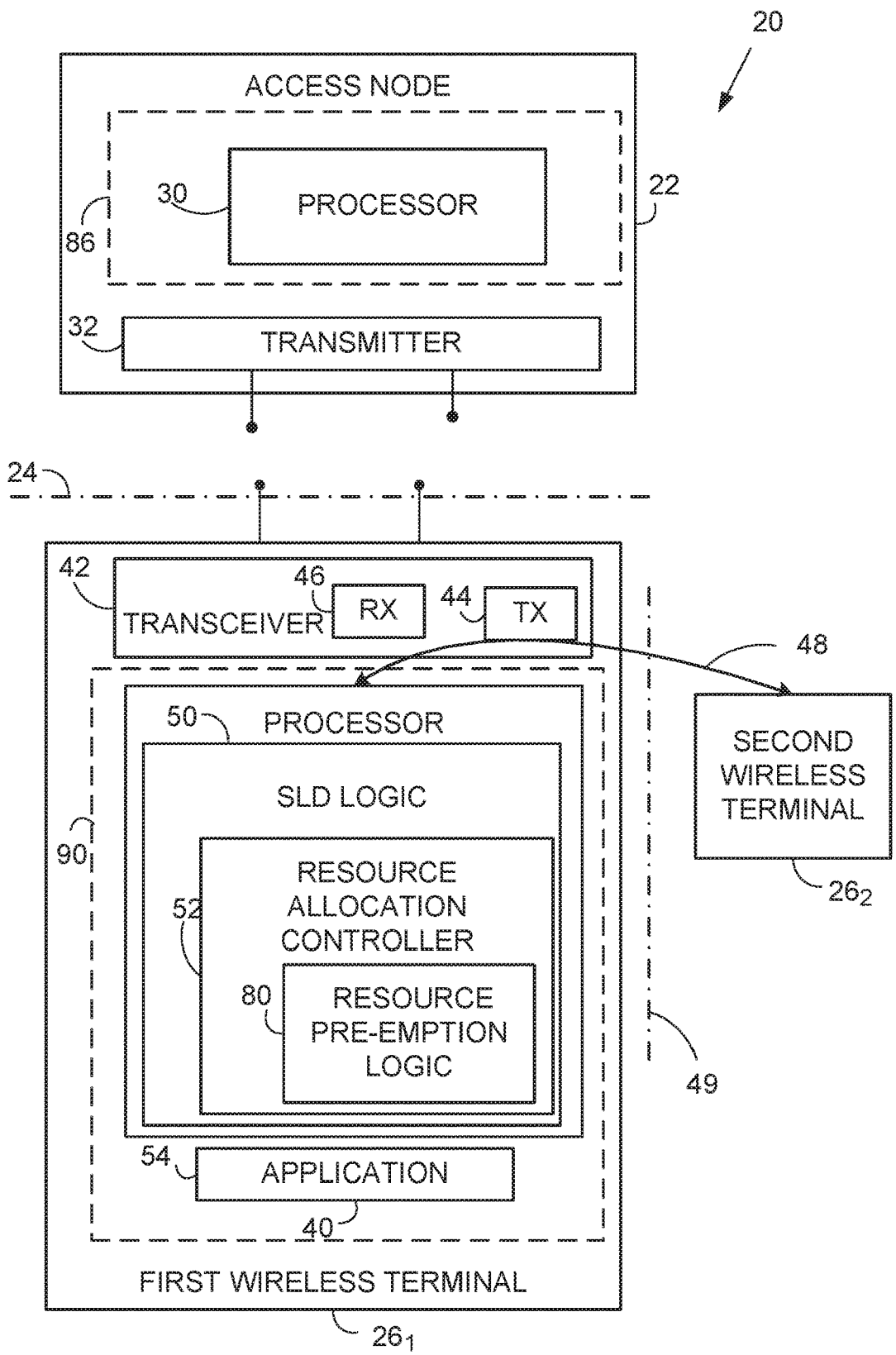
FIG. 1C is a schematic view of an example embodiment of a radio communications network wherein when allocating resources for sidelink direct communication resource preemption is controlled by a wireless terminal.

FIG. 1C shows an example embodiment and mode of terminal processor 40 of first wireless terminal $26_1$ wherein resource allocation controller 52B comprises resource pre-emption logic 80. The resource pre-emption logic 80 thus comprises or is subsumed by terminal processor 40, and may also be referred to as "processor" or "processor circuitry". As used herein, pre-emption may occur on a per transmission basis.

Figure 9A:
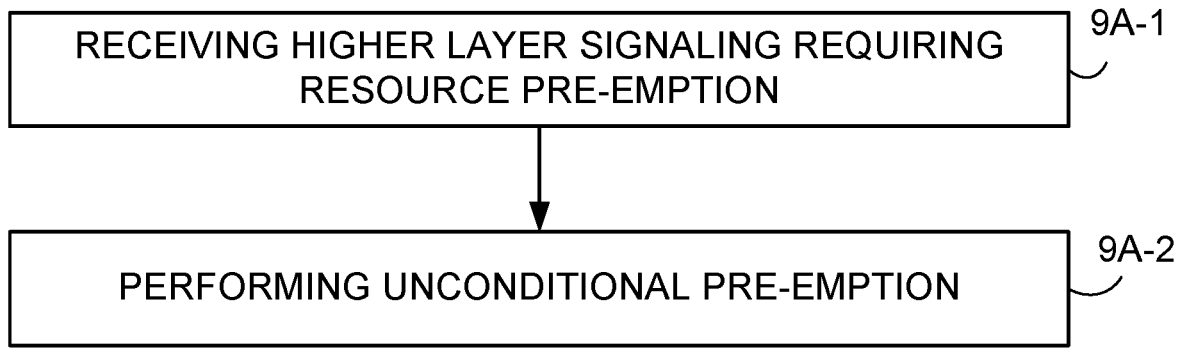
FIG. 9A is a flowchart showing example, representative acts or steps that may be performed by the wireless terminal of FIG. 1C in a first generic method of pre-emptive resource selection.
Figure 9B:
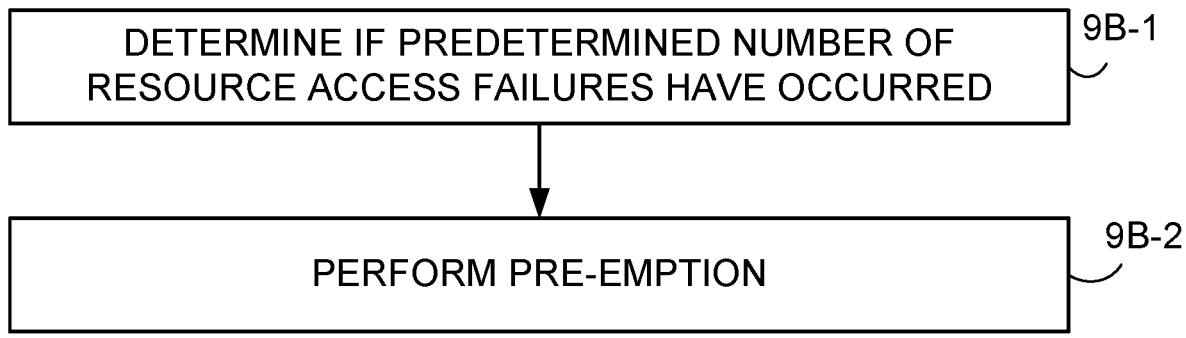
FIG. 9B is a flowchart showing example, representative acts or steps that may be performed by the wireless terminal of FIG. 1C in a second generic method of pre-emptive resource selection.

FIG. 9A and FIG. 9B show example, representative acts or steps that may be performed by the wireless terminal of FIG. 1C in alternate generic methods of a pre-emptive resource selection technique. The method of FIG. 9A and/or of FIG. 9B may be executed on processor circuitry of first wireless terminal $26_1$, e.g., on terminal processor 40 including resource pre-emption logic 80 by executing instructions stored on non-transitory media. The basic acts of FIG. 9A comprising such execution are shown as act 9-1 and act 9-2.

Act 9A-1 comprises the processor receiving higher layer signaling which requires that resource pre-emption be performed, e.g., the pre-emption be performed essentially unconditionally. Act 9A-2 comprises the processor executing the pre-emption, e.g., allocating a particular resource for use in the sidelink direct transmission. FIG. 9A thus essentially involves unconditional pre-emption in response to high layer requirements.

FIG. 9B shows an alternate method wherein pre-emption is performed after a failure of some specified number of attempts of resource access, e.g., making a determination that a resource should be pre-empted after finding that the resource or some resources or all resources are occupied. Act 9B-1 thus comprises the processor making a determination that a predetermined number of attempts to use a one or more candidate resources has failed (e.g., the one or more candidate resources were already in use/occupied). If the determination of act 9B-1 is positive, as act 9B-2 the processor pre-empts a candidate resource for the sidelink direct transmission.

For act 9B-1, the number of failures (e.g., the predetermined number of attempts) may be any integer, including "1" (which would mean that once finding a collision, e.g., upon an initial detection of collision, the pre-emption is performed right away). Alternatively, for act 9B-1 the predetermined number may be greater than one, e.g., more than one such attempts, or even set to a high number that may require checking of all or almost all of the resources. The method of FIG. 9B, and the predetermined number, may be dependent on a service requirement, e.g., whether the transmission requires immediate resource access, or can tolerate some delay.

When the resource pool allocation/access is associated with the priority, unless there is dedicated pre-emption priority from upper layers, this priority is also used for pre-emption.

In an example embodiment and mode, a wireless terminal participating in a sidelink direct communication obtains one or more indicators or flags which reflect or specify pre-emption posture of the sidelink direct communication. Such flags or indicators are generically referred to herein as "pre-emption posture indicators". The flags or indicators which reflect or specify pre-emption posture of the sidelink direct communication are preferably based on pre-emption priority of the communication. One such indicator or flag is a Pre-emption Capability Indicator (PCI) which defines or indicates whether the transmission of a specified priority can pre-empt resources from a transmission with lower priority. Another such indicator or flag is a Pre-emption Vulnerability Indicator (PVI) which defines or indicates whether an ongoing transmission with its specified priority can be pre-empted by a transmission of a higher priority, e.g., a transmission with a Pre-emption Capability Indicator (PCI).

The pre-emption posture indicator may be obtained by the wireless terminal from various sources. In one example embodiment and mode, the pre-emption posture indicator may be obtained from upper layers (e.g., an upper layer application 54) associated with priority information.

In another example embodiment and mode, the pre-emption posture indicator may be associated with and/or included with (e.g., comprise) resource pool information (e.g., pool information 60), and as such may be obtained in similar manner as the resource pool information (e.g., via dedicated signaling, SIB 18, or pre-configuration). That is, both Pre-emption Capability Indicator (PCI) and Pre-emption
Vulnerability Indicator (PVI) may be obtained from one or both of the following alternatives: (A) upper layers associated with priority information; and (B) association with resource pool information so as to be obtained by the same ways as resource pool information indications, which are dedicated signalling, SIB 18, and pre-configuration.

Figure 10A:
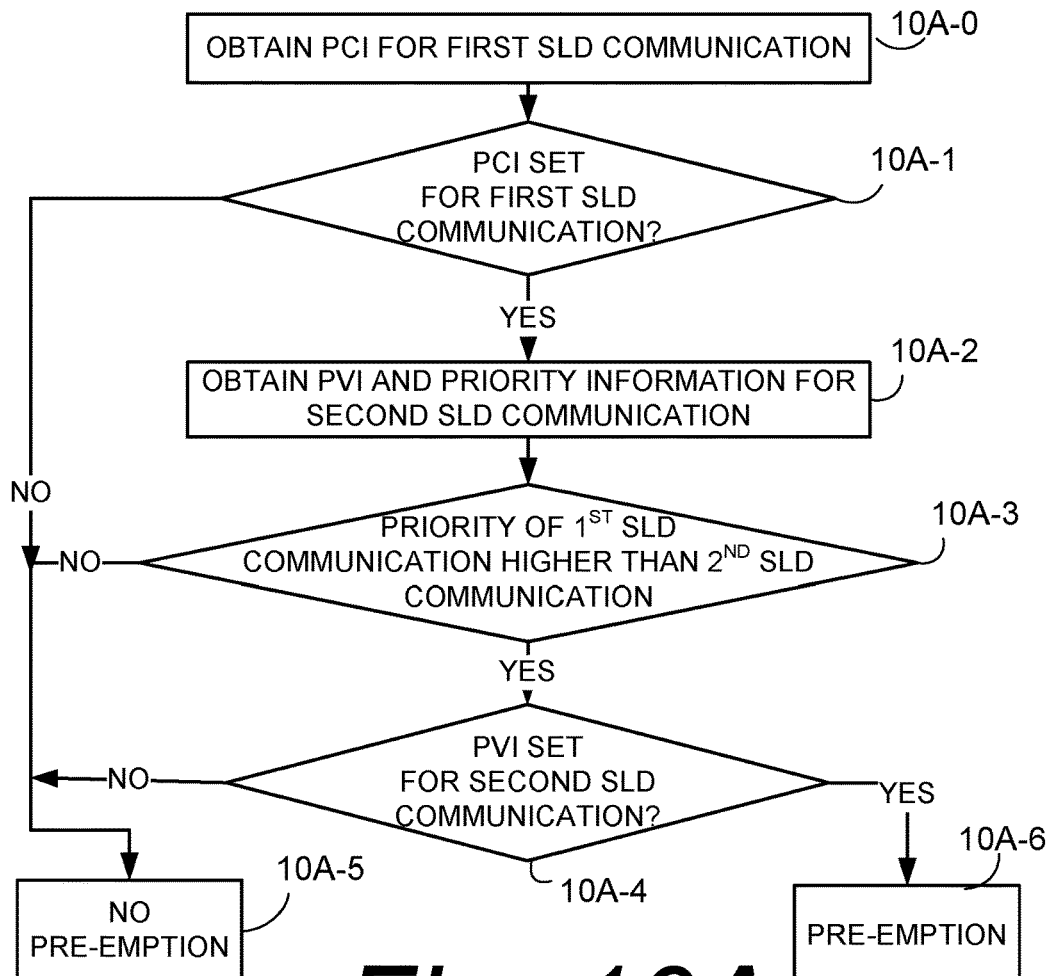
FIG. 10A is a flowchart showing representative example acts or steps that may be performed by a wireless terminal actively seeking to pre-empt resources of a second sidelink direct communication for use in a first sidelink direct communication.

FIG. 10A shows representative example acts or steps that may be performed by a wireless terminal having a higher priority actively seeking to pre-empt resources of a second sidelink direct communication for use in a first sidelink direct communication. Act 10A-0 comprises the wireless terminal which is actively seeking pre-emption obtaining the Pre-emption Capability Indicator (PCI) for a first sidelink direct communication. Act 10A-1 comprises the active wireless terminal checking whether the Pre-emption Capability Indicator (PCI) for the first sidelink direct communication is set to indicate that the active wireless terminal has offensive pre-emption capability for the first sidelink direct communication. If the check of act 10A-1 is positive, as act 10A-2 the active wireless terminal obtains the Pre-emption Vulnerability Indicator (PVI) and the priority information for the second sidelink direct communication (which may be communication of the same wireless terminal or another wireless terminal). Act 10A-3 comprises the active wireless terminal determining whether the priority of the first SLD communication, e.g., the priority of the SLD communication for which the wireless terminal is actively seeking to pre-empt resources, is higher than the priority of the second sidelink direct communication. Act 10A-3 comprises the active wireless terminal determining whether the Pre-emption Vulnerability Indicator (PVI) for the second sidelink direct communication is set to indicate that the second sidelink direct communication is vulnerable. If any one of the determinations of act 10A-1, act 10A-3, or act 10A-4 is negative, no pre-emption occurs (act 10A-5). But if the priority of the first SLD communication is higher than the priority of the second sidelink direct communication and if the Pre-emption Vulnerability Indicator (PVI) for the second communication is set, as act 10A-6 the active wireless terminal pre-empts the sought sidelink direct radio resource.

Figure 10B:
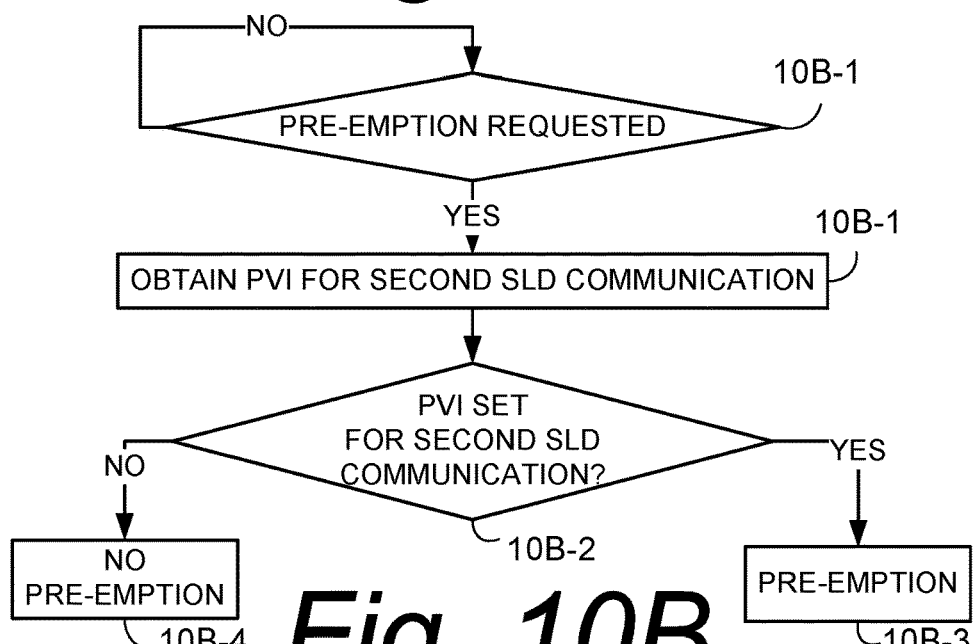
FIG. 10B is a flowchart showing representative example acts or steps that may be performed by a passive wireless terminal which is being requested by an active wireless terminal to relinquish a contested sidelink direct resource.

Conversely, FIG. 10B shows representative example acts or steps that may be performed by a second (passive) wireless terminal which is being requested by an active wireless terminal (e.g., another wireless terminal actively seeking to pre-empt resources) to relinquish a contested resource of a second sidelink direct communication currently in use for a second sidelink direct communication. Act 10B-0 comprises the second (passive) wireless terminal ascertaining that a pre-emption request has been received from active wireless terminal which is actively seeking pre-emption. In view of the acts of FIG. 10A, for this particular embodiment it is presumed that the active wireless terminal has determined that its Pre-emption Capability Indicator (PCI) is set as a pre-requisite for making the active pre-emption request. Act 10B-1 comprises the second wireless terminal obtaining its Pre-emption Vulnerability Indicator (PVI). Act 10B-2 comprises the second wireless terminal checking whether its Pre-emption Vulnerability Indicator (PVI) is set (the Pre-emption Vulnerability Indicator (PVI) being set indicates vulnerability of the second wireless terminal to a pre-emption request from a wireless terminal whose Pre-emption Capability Indicator (PCI) is set). If it is determined as act 10B-2 that the Pre-emption Vulnerability Indicator (PVI) is set, as act 10B-3 the second wireless terminal relinquishes the sought sidelink direct resource as the pre-emption is successful. On the other hand, if it is determined as act 10B-2 that the Pre-emption Vulnerability Indicator (PVI) is not set, as act 10B-4 the second wireless terminal retains use of the sought sidelink direct resource as the pre-emption is not successful.

Regarding both FIG. 10A and FIG. 10B, simply speaking, whether one transmission (active pre-emption seeker) can pre-empt another transmission's (passive pre-emption user) resource depends on (1) PCI of active pre-emption seeker is valid; (2) PVI of passive pre-emption user is valid (3) active pre-emption seeker has higher priority than passive pre-emption user. In FIG. 10B the pre-emption seeker has checked all three conditions are satisfied so that it can initialize pre-emption. The transmission being pre-empted in the FIG. 10B scenario, on the other hand, should then need only to check whether its own PVI is valid and, if it is valid, then it can be pre-empted.

If the wireless terminal is in Mode 1 transmission or Mode 2 transmission with resource pool indicated by dedicated signaling from eNB, the eNB controls the pre-emption if the network is congested. On the other hand, if the wireless terminal is in Mode 2 transmission with resource pool indicated by SIB 18 or pre-configuration, or if the wireless terminal uses the exceptional case resource pool for transmission, the wireless terminal controls the pre-emption by itself.

Pre-emption, including but not limited to the pre-emption features of the technology disclosed herein, may be used in (1) in conjunction with the discriminate resource selection mode/techniques described above (including the modified priority-based resource pool access method) or (2) in conjunction with either the common resource pool access method or the priority-based resource pool access method, as described separately below.

If the contention based access embodiment and mode of the discriminate resource selection mode/techniques is used, the wireless terminal is able to detect collision. When the congestion/collision is detected, the higher priority communication/transmission (which requires transmission resources with valid Pre-emption Capability Indicator (PCI) flag) is able to pre-empt resources of lower priority communication/transmission (with valid Pre-emption Vulnerability Indicator (PVI) flag).

On the other hand, if the common resource pool access method or priority-based resource pool access method is used, the wireless terminal performs random access to the selected resource pool without collision detection. Ordinarily there would not be a resource collision problem if the two wireless terminals are far remote from one another but use the same resources for transmission. In any event, once a wireless terminal has taken (e.g., allocated) a resource, that wireless terminal should notify other wireless terminals in its proximity as to which resources in which resource pool are taken/allocated, by which priority level wireless terminals the resources are taken/allocated. Then the higher priority wireless terminal can decide whether the higher priority wireless terminal should perform pre-emption.

Figure 11:
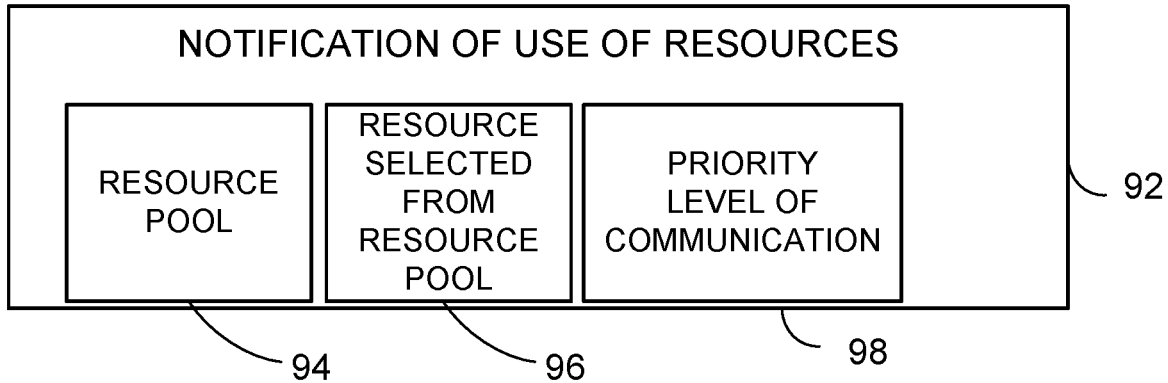
FIG. 11 is a diagrammatic view of example content of a resource occupation status notification.

For the common resource pool access method or priority-based resource pool access method, the notification of allocation/use of resources for use in a sidelink direct communication may be accomplished in several different ways. The notification of allocation/use of resources for use in a sidelink direct communication may also be referred to as "resource occupation status". In an example implementation shown in FIG. 11, a notification of allocation/use of resources 92 may be provided using bits, fields, or information elements (IEs) of signaling channels. For example, a first field of the notification may comprise an indication or identification (94) of the resource pool from which the resource was selected; a second field of the notification may comprise an indication or identification (96) of the particular resource selected from the resource pool; and a third field may comprise an indication (98) of a priority level of the communication (or of the wireless terminal transmitting the communication).

As mentioned above, the notification may be accomplished in using signaling channels. For example, the resource occupation situation may be notified either through reserved bits in the Physical Sidelink Broadcast Channel (PSBCH), or new signalling bits in the Physical Sidelink Control Channel (PSCCH), or even attached bits to data transmission in the Physical Sidelink Shared Channel (PSSCH).

In details, all wireless terminals should provide notification of resource occupation information once they take these resources. Hence, the high priority wireless terminals can know the occupation situation of resource pools which they can access in order to make a pre-emption decision.

Figure 12:
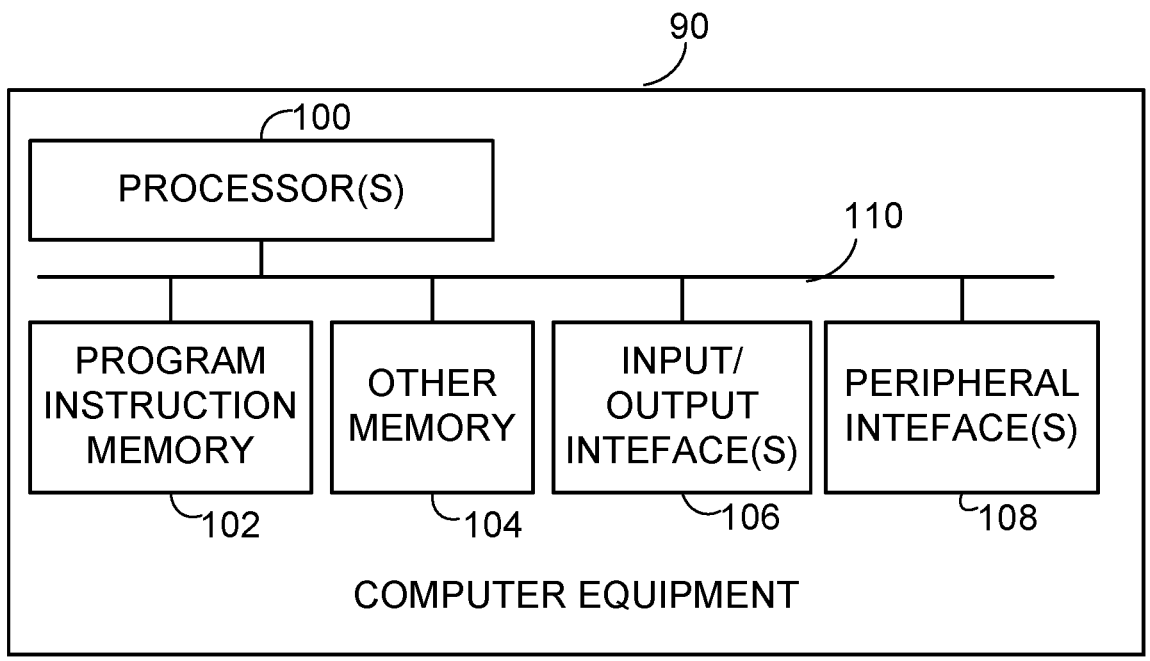
FIG. 12 is a schematic view showing aspects of electronic machinery that may comprise a node or a wireless terminal according to an example embodiment.

Certain units and functionalities of first wireless terminal $26_1$ framed by broken line are, in an example embodiment, implemented by electronic machinery 90. FIG. 12 shows an example of such electronic machinery, as comprising one or more processors 100, program instruction memory 102; other memory 104 (e.g., RAM, cache, etc.); input/output interfaces 106; peripheral interfaces 108; support circuits 109; and busses 110 for communication between the aforementioned units.

The memory 104, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 109 are coupled to the processors 100 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array signal (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

In one of its aspects the technology disclosed herein thus concerns a method of operating a wireless terminal. The method comprises executing, on processor circuitry of the wireless terminal, sidelink direct instructions stored on non-transitory media configured to perform a sidelink direct communication with another wireless terminal; receiving a non-nominal pool quantity parameter which specifies a greater number of graduations of pooled radio resources than is defined by a nominal resource pool quantity parameter; and in conjunction with execution of the sidelink direct instructions, the processor circuitry selecting a resource for use in the sidelink direct communication from a resource pool structure at least partially configured by the non-nominal pool quantity parameter.

In an example embodiment and mode the method further comprises receiving a sub-pool quantity parameter as the non-nominal pool quantity parameter, the sub-pool quantity parameter specifying a number of sub-pools which comprise one or more of nominal resource pools available for resource selection as defined by a nominal resource pool quantity parameter; and, on the basis of priority of the sidelink direct communication and in conjunction with execution of the sidelink direct instructions, the processor circuitry selecting a resource for use in the sidelink direct communication from a resource pool structure at least partially configured by the sub-pool quantity parameter.

In an example embodiment and mode the resource pool structure is at least partially configured by the nominal resource pool quantity parameter and the sub-pool quantity parameter.

In an example embodiment and mode the method further comprises receiving the sub-pool quantity parameter from an application executing on the processor at a higher layer than the sidelink direct instructions.

In an example embodiment and mode the method further comprises receiving an override pool quantity parameter as the non-nominal pool quantity parameter, the override pool quantity parameter specifying a number resource pools available for resource selection; and on the basis of priority of the sidelink direct communication and in conjunction with execution of the sidelink direct instructions, the processor circuitry selecting a resource for use in the sidelink direct communication from a resource pool structure at least partially configured by the override pool quantity parameter rather than by a nominal resource pool quantity parameter.

In an example embodiment and mode the method further comprises receiving the override pool quantity parameter from an application executing on the processor at a higher layer than sidelink direct instructions.

In another of its aspects the technology disclosed herein concerns a wireless terminal which comprises processor circuitry and a transmitter. The processor circuitry is configured, in conjunction with performance of a sidelink direct communication with another wireless terminal: to receive a non-nominal pool quantity parameter which specifies a greater number of graduations of pooled radio resources than is defined by a nominal resource pool quantity parameter; and, to select a resource for use in the sidelink direct communication from a resource pool structure at least partially configured by the non-nominal pool quantity parameter. The transmitter is configured to use the selected resource in the sidelink direct communication.

In an example embodiment and mode the processor circuitry is further configured: to receive a sub-pool quantity parameter as the non-nominal pool quantity parameter, the sub-pool quantity parameter specifying a number of sub-pools which comprise one or more of nominal resource pools available for resource selection as defined by a nominal resource pool quantity parameter; and on the basis of priority of the sidelink direct communication and in conjunction with execution of the sidelink direct instructions, to select a resource for use in the sidelink direct communication from a resource pool structure at least partially configured by the sub-pool quantity parameter.

In an example embodiment and mode the resource pool structure is at least partially configured by the nominal resource pool quantity parameter and the sub-pool quantity parameter.

In an example embodiment and mode the processor circuitry is further configured to receive the sub-pool quantity parameter from an application executing on the processor circuitry at a higher layer than an application for sidelink direct instructions.

In an example embodiment and mode the processor circuitry is further configured: to receive an override pool quantity parameter as the non-nominal pool quantity parameter, the override pool quantity parameter specifying a number resource pools available for resource selection; and on the basis of priority of the sidelink direct communication and in conjunction with execution of the sidelink direct instructions, to select a resource for use in the sidelink direct communication from a resource pool structure at least partially configured by the override pool quantity parameter rather than by a nominal resource pool quantity parameter.

In an example embodiment and mode the processor circuitry is further configured to receive the override pool quantity parameter from an application executing on the processor circuitry at a higher layer than sidelink direct instructions.

In another of its aspects the technology disclosed herein concerns another method of operating a wireless terminal. The method comprises: executing, on processor circuitry of the wireless terminal, sidelink direct instructions stored on non-transitory media configured to perform a sidelink direct communication, the sidelink direct communication comprising the acts of: selecting a selected resource pool; using a discriminate selection technique to select a selected resource from the selected resource pool; using the selected resource in conjunction with sidelink direct communications with another wireless terminal.

In an example embodiment and mode the method further comprises using a contention avoidance resource selection technique as the discriminate selection technique to select the selected resource from the selected resource pool.

In an example embodiment and mode the method further comprises using a pre-verified resource selection technique wherein an evaluated resource is proven to be sufficiently congestion/collision free before being used as the selected resource in the sidelink direct communication.

In an example embodiment and mode the method further comprises using an algorithmic resource selection technique as the discriminate selection technique to select the selected resource from the selected resource pool.

In another of its aspects the technology disclosed herein concerns a wireless terminal comprising processor circuitry configured, in conjunction with performance of a sidelink direct communication with another wireless terminal: to select a selected resource pool; and to use a discriminate selection technique to select a selected resource from the selected resource pool. The wireless terminal also comprises a transmitter configured to use the selected resource in conjunction with sidelink direct communications with another wireless terminal.

In an example embodiment and mode the processor circuitry is further configured to use a contention avoidance resource selection technique as the discriminate selection technique to select the selected resource from the selected resource pool.

In an example embodiment and mode the processor circuitry is further configured to use a pre-verified resource selection technique wherein an evaluated resource is proven to be sufficiently congestion/collision free before being used as the selected resource in the sidelink direct communication.

In an example embodiment and mode the processor circuitry is further configured to use an algorithmic resource selection technique as the discriminate selection technique to select the selected resource from the selected resource pool.

In another of its aspects the technology disclosed herein concern a method of operating a wireless terminal for resource pre-emption. The method comprises executing, on processor circuitry of the wireless terminal, sidelink direct instructions stored on non-transitory media configured to perform a sidelink direct communication, the sidelink direct communication comprising the acts of: the processor making a determination whether the processor is to pre-empt a candidate resource currently being used by another communication; in accordance with the determination the processor either using the candidate resource for the sidelink direct communication or selecting another resource for the sidelink direct communication.

In an example embodiment and mode making the determination comprises receiving a signal from a higher layer that pre-emption is to be performed.

In an example embodiment and mode making the determination comprises the processor checking availability of resources.

In an example embodiment and mode making the determination comprises the processor checking availability of an Nth candidate resource, where N is an integer 1 or greater.

In an example embodiment and mode the method further comprises: obtaining a pre-emption posture indicator for the communication; and, the processor using the pre-emption posture indicator to make the determination whether the processor is to pre-empt a candidate resource currently being used by another communication.

In an example embodiment and mode the method further comprises processor using the pre-emption posture indicator to make the determination whether the processor is to pre-empt the candidate resource currently being used by another wireless terminal for the another communication.

In an example embodiment and mode the method further comprises the processor making the determination by evaluating the pre-emption posture indicator of the communication relative to a pre-emption posture indicator of the another communication.

In an example embodiment and mode the method further comprises the processor making the determination that the processor is to pre-empt the candidate resource when the pre-emption posture indicator of the communication is a Pre-emption Capability Indicator (PCI) and the pre-emption posture indicator of the another communication is a Pre-emption Vulnerability Indicator (PVI).

In an example embodiment and mode the method further comprises the processor obtaining the pre-emption posture indicator from a higher layer associated with priority information.

In an example embodiment and mode the method further comprises the processor obtaining the pre-emption posture indicator from one or more of (1) dedicated signaling; (2) system information block (SIB) 18, and (3) pre-configured information.

In an example embodiment and mode the method further comprises the processor providing to another wireless terminal a signal including a resource occupation status notification.

In an example embodiment and mode the method further comprises the processor configuring the resource occupation status notification to include: an indication or identification of a resource pool from which the resource was selected; an indication or identification of the resource selected from the resource pool; and an indication of a priority level of the communication or of the wireless terminal transmitting the communication.

In an example embodiment and mode the signal is included in at least one of a Physical Sidelink Broadcast Channel (PSBCH), a Physical Sidelink Control Channel (PSCCH), and a Physical Sidelink Shared Channel (PSSCH).

In another of its aspect the technology disclosed herein concerns a wireless terminal that pre-empts resources for sidelink direct communication. The wireless terminal comprises processor circuitry configured to execute sidelink direct instructions stored on non-transitory media configured to perform a sidelink direct communication, the sidelink direct communication comprising the acts of: making a determination whether the processor is to pre-empt a candidate resource currently being used by another communication; in accordance with the determination, either using the candidate resource for the sidelink direct communication or selecting another resource for the sidelink direct communication.

In an example embodiment and mode the processor circuitry is further configured to make the determination by receiving a signal from a higher layer that pre-emption is to be performed.

In an example embodiment and mode the processor circuitry is further configured to make the determination by checking availability of resources.

In an example embodiment and mode the processor circuitry is further configured to make the determination by checking availability of an Nth candidate resource, where N is an integer 1 or greater.

In an example embodiment and mode the processor circuitry is further configured to: obtain a pre-emption posture indicator for the communication; and, use the pre-emption posture indicator to make the determination whether the processor is to pre-empt a candidate resource currently being used by another communication.

In an example embodiment and mode the processor circuitry is further configured to use the pre-emption posture indicator to make the determination whether the processor is to pre-empt the candidate resource currently being used by another wireless terminal for the another communication.

In an example embodiment and mode the processor circuitry is further configured to make the determination by evaluating the pre-emption posture indicator of the communication relative to a pre-emption posture indicator of the another communication.

In an example embodiment and mode the processor circuitry is further configured to make the determination that the processor is to pre-empt the candidate resource when the pre-emption posture indicator of the communication is a Pre-emption Capability Indicator (PCI) and the pre-emption posture indicator of the another communication is a Pre-emption Vulnerability Indicator (PVI).

In an example embodiment and mode the processor circuitry is further configured to obtain the pre-emption posture indicator from a higher layer associated with priority information.

In an example embodiment and mode the processor circuitry is further configured to obtain the pre-emption posture indicator from one or more of (1) dedicated signaling; (2) system information block (SIB) 18, and (3) pre-configured information.

In an example embodiment and mode wherein the processor circuitry is further configured to provide to another wireless terminal a signal including a resource occupation status notification.

In an example embodiment and mode the processor circuitry is further configured to configure the resource occupation status notification to include: an indication or identification of a resource pool from which the resource was selected; an indication or identification of the resource selected from the resource pool; and an indication of a priority level of the communication or of the wireless terminal transmitting the communication.

In an example embodiment and mode the signal is included in at least one of a Physical Sidelink Broadcast Channel (PSBCH), a Physical Sidelink Control Channel (PSCCH), and a Physical Sidelink Shared Channel (PSSCH).

Some the terminology employed for concepts as described herein has been updated or changed in more recent industry documentation, such as the 3GPP Technical Standards, for example. As mentioned above, "device-to-device (D2D)" is now also called "sidelink direct". Some other terminology has also changed, a partial listing appearing in Table 1 below.

TABLE 1

Terminology

| Previous Terminology | New Terminology |
| --- | --- |
| Schedule assignment (SA) | PSCCH Physical Sidelink Control Channel |
| PD2DSCH (Phys. D2D Synch. Channel) | PSBCH (Phys. Sidelink Broadcast Channel) |
| D2DSS (D2D synchronization signals) | SLSS (Sidelink Synchronization Signals) |
| D2D Communications or Data Channel | PSSCH (Physical Sidelink Shared Channel) |
| D2D Discovery Channel | PSDCH (Physical Sidelink Discovery Channel) |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A user equipment (UE) comprising:
    processing circuitry configured to (a) obtain an SL-Preconfiguration information element including a first parameter used for configuring first resource pools for sidelink direct communications and (b) randomly select a resource from a resource pool, after selecting, based on priority configured for the first resource pools, the resource pool from the first resource pools, the SL-Preconfiguration information element including a second parameter which is different from the first parameter and is used for configuring second resource pools for sidelink direct communication, the first resource pools being constituted by (i) the second resource pools and (ii) additional resource pools, the resource being randomly selected in a case that the UE is out of coverage on a sidelink carrier; and
    transmitting circuitry configured to perform a Physical Sidelink Shared Channel transmission using the resource based on the SL-Preconfiguration information element,
    wherein the second resource pools are configured such that a total number of the second resource pools is not more than a maximum number defined for the second resource pools.

2. A method for a user equipment (UE), the method comprising:
    using processing circuitry to obtain an SL-Preconfiguration information element including a first parameter used for configuring first resource pools for sidelink direct communications, the SL-Preconfiguration information element including a second parameter which is different from the first parameter and is used for configuring second resource pools for sidelink direct communications, the first resource pools being constituted by (i) the second resource pools and (ii) additional resource pools;
    using the processing circuitry to randomly select a resource from a resource pool, after selecting, based on priority configured for the first resource pools, the resource pool from the first resource pools, the resource being randomly selected in a case that the UE is out of coverage on a sidelink carrier; and
    transmitting a Physical Sidelink Shared Channel transmission using the resource based on the SL-Preconfiguration information element, wherein the second resource pools are configured such that a total number of the second resource pools is not more than a maximum number defined for the second resource pools.

* * * * *